United States Patent
Shin et al.

(10) Patent No.: US 11,523,416 B2
(45) Date of Patent: Dec. 6, 2022

(54) METHOD AND DEVICE FOR TRANSMITTING PUSCH BY CHANGING THE NUMBER OF BITS OF DCI FIELD IN WIRELESS COMMUNICATION SYSTEM

(71) Applicant: LG Electronics Inc., Seoul (KR)

(72) Inventors: Seokmin Shin, Seoul (KR); Suckchel Yang, Seoul (KR); Seonwook Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/592,214

(22) Filed: Feb. 3, 2022

(65) Prior Publication Data

US 2022/0159686 A1    May 19, 2022

Related U.S. Application Data

(63) Continuation of application No. PCT/KR2020/014403, filed on Oct. 21, 2020.
(Continued)

(30) Foreign Application Priority Data

Oct. 21, 2019 (KR) .......... 10-2019-0130808
Nov. 8, 2019 (KR) .......... 10-2019-0142917
(Continued)

(51) Int. Cl.
*H04L 12/28* (2006.01)
*H04W 72/12* (2009.01)
(Continued)

(52) U.S. Cl.
CPC ... *H04W 72/1268* (2013.01); *H04W 72/0453* (2013.01); *H04W 74/08* (2013.01)

(58) Field of Classification Search
CPC ........ H04L 5/0094; H04L 2012/5631; H04W 48/12; H04W 72/0453; H04W 72/04; H04W 72/1278
(Continued)

(56) References Cited

U.S. PATENT DOCUMENTS 11,070,951 B2 *  7/2021  Abdoli ............... H04L 5/0044
2010/0040001 A1   2/2010  Montojo et al.
(Continued)

FOREIGN PATENT DOCUMENTS

WO     WO2019157720        8/2019

OTHER PUBLICATIONS

Ericsson, "PDCCH Enhancements for NR URLLC," R1-1910545, Presented at 3GPP TSG-RAN WG1 Meeting #98bis, Chongqing, China, Oct. 14-20, 2019, 22 pages.
(Continued)

*Primary Examiner* — John Pezzlo
(74) *Attorney, Agent, or Firm* — Fish & Richardson P.C.

(57) ABSTRACT

Provided are a method and device for transmitting and receiving a signal in a wireless communication system according to an embodiment of the present invention, the method comprising: receiving DCI for scheduling a PUSCH; and transmitting the PUSCH on the basis of the DCI. An FDRA field in the DCI includes LSBs of K bits including information about an RB set. The K bits are converted into L bits on the basis of the number N of RB sets set in the current active BWP being different from the number M of RB sets set in a specific BWP.

15 Claims, 12 Drawing Sheets

Related U.S. Application Data

(60) Provisional application No. 63/032,717, filed on May 31, 2020, provisional application No. 63/015,661, filed on Apr. 26, 2020, provisional application No. 63/015,457, filed on Apr. 24, 2020, provisional application No. 62/938,924, filed on Nov. 21, 2019, provisional application No. 62/937,752, filed on Nov. 19, 2019, provisional application No. 62/937,116, filed on Nov. 18, 2019.

(30) Foreign Application Priority Data

Feb. 13, 2020 (KR) ........................ 10-2020-0017350
May 11, 2020 (KR) ........................ 10-2020-0056013

(51) Int. Cl.
 *H04W 72/04* (2009.01)
 *H04W 74/08* (2009.01)
 *H04J 1/16* (2006.01)

(58) Field of Classification Search
 USPC ................................ 370/252, 320, 430, 329
 See application file for complete search history.

(56) References Cited

U.S. PATENT DOCUMENTS

| | | | | |
|---|---|---|---|---|
| 2019/0312635 | A1* | 10/2019 | Ang | H04B 7/005 |
| 2019/0313412 | A1* | 10/2019 | Baldemair | H04L 5/00 |
| 2020/0267511 | A1* | 8/2020 | Abdoli | H04L 5/0094 |
| 2021/0105166 | A1* | 4/2021 | Khoshnevisan | H04L 27/2675 |
| 2021/0185679 | A1* | 6/2021 | Yoshimura | H04W 72/0453 |
| 2022/0109479 | A1* | 4/2022 | Liu | H04L 25/0224 |
| 2022/0200671 | A1* | 6/2022 | Wu | H04B 7/0456 |

OTHER PUBLICATIONS

International Search Report in International Appln. No. PCT/KR2020/014403, dated Feb. 10, 2021, 5 pages (with English translation).
Nokia & Nokia Shanghai Bell, "On Enhanced UL Configured Grant Transmission for NR URLLC and activation/release of multiple SPS configurations," R1-1910869, Presented at 3GPP TSG RAN WG1 Meeting #98bis, Chongqing, China, Oct. 14-20, 2019, 12 pages.
Nokia & Nokia Shanghai Bell, "On PDCCH Enhancements for NR URLLC," R1-1910798, Presented at 3GPP TSG RAN WG1#98bis, Chongqing, China, Oct. 14-20, 2019, 21 pages.
Qualcomm Incorporated, "Cross-slot scheduling power saving techniques," R1-1911130, Presented at 3GPP TSG-RAN WG1 #98bis, Chongqing, China, Oct. 14-20, 2019, 18 pages.
3GPP, "3rd Generation Partnership Project; Technical Specification Group Radio Access Network; NR; Multiplexing and channel coding (Release 15)," TS 38.212 V15.7.0, Sep. 2019, 101 pages.
3GPP, "3rd Generation Partnership Project; Technical Specification Group Radio Access Network; NR; Physical layer procedures for control (Release 15)," TS 38.213 V15.7.0, Sep. 2019, 108 pages.
Extended European Search Report in European Appln. No. 20880031.8, dated Jun. 24, 2022, 12 pages.
Nokia & Nokia Shanghai Bell, "Remaining NR-U enhancements for uplink signals and channels," R1-1910594, Presented at 3GPP TSG RAN WG1 #98bis, Chongqing, P.R. China, Oct. 14-20, 2019, 13 pages.
Vivo, "Remaining issues on BWP operation," R1-1801544, Presented at 3GPP TSG RAN WG1 Meeting #92, Athens, Greece, Feb. 26-Mar. 2, 2018, 5 pages.
Nokia & Nokia Shanghai Bell, "Remaining NR-U enhancements for uplink signals and channels," R1-1910594, Presented at 3GPP TSG RAN WG1 #98bis, Chongqing, P.R. China, Oct. 14-20, 2019, 13 pages.
Office Action in Korean Appln. No. 10-2021-7042827, dated Oct. 26, 2022, 13 pages (with English translation).

* cited by examiner

Carrier aggregation between L-band and U-band

Standalone U-band(s)

METHOD AND DEVICE FOR TRANSMITTING PUSCH BY CHANGING THE NUMBER OF BITS OF DCI FIELD IN WIRELESS COMMUNICATION SYSTEM

CROSS-REFERENCE TO RELATED APPLICATIONS

This application is a continuation of International Application No. PCT/KR2020/014403, filed on Oct. 21, 2020, which claims the benefit of U.S. Provisional Application No. 63/032,717, filed on May 31, 2020, Korean Application No. 10-2020-0056013, filed on May 11, 2020, U.S. Provisional Application No. 63/015,661, filed on Apr. 26, 2020, U.S. Provisional Application No. 63/015,457, filed on Apr. 24, 2020, Korean Application No. 10-2020-0017350, filed on Feb. 13, 2020, U.S. Provisional Application No. 62/938,924, filed on Nov. 21, 2019, U.S. Provisional Application No. 62/937,752, filed on Nov. 19, 2019, U.S. Provisional Application No. 62/937,116, filed on Nov. 18, 2019, Korean Application No. 10-2019-0142917, filed on Nov. 8, 2019, and Korean Application No. 10-2019-0130808, filed on Oct. 21, 2019. The disclosures of the prior applications are incorporated by reference in their entirety.

TECHNICAL FIELD

The present disclosure relates to a method and apparatus for use in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

The object of the present disclosure is to provide a method and apparatus for transmitting an uplink channel efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

According to one aspect of the present disclosure, a method of transmitting and receiving a signal by a user equipment (UE) in a wireless communication system may include receiving downlink control information (DCI), and transmitting a physical uplink shared channel (PUSCH) based on the DCI. The PUSCH may be transmitted in a specific bandwidth part (BWP) different from a current active BWP, based on the DCI. A frequency domain resource assignment (FDRA) field in the DCI may include K least significant bits (LSBs) including information about a resource block (RB) set. Based on the number N of RB sets configured in the current active BWP being different from the number M of RB sets configured in the specific BWP, the K bits may be changed to L bits.

According to another aspect of the present disclosure, a communication device (UE) for transmitting and receiving a signal in a wireless communication system may include at least one transceiver, at least one processor, and at least one memory operably coupled to the at least one processor and storing instructions which when executed, cause the at least one processor to perform specific operations. The specific operations may include receiving DCI, and transmitting a PUSCH based on the DCI. The PUSCH may be transmitted in a specific BWP different from a current active BWP, based on the DCI. An FDRA field in the DCI may include K LSBs including information about an RB set. Based on the number N of RB sets configured in the current active BWP being different from the number M of RB sets configured in the specific BWP, the K bits may be changed to L bits.

According to another aspect of the present disclosure, an apparatus for a UE may include at least one processor, and at least one computer memory operably coupled to the at least one processor and storing instructions which when executed, cause the at least one processor to perform operations. The operations may include receiving DCI, and transmitting a PUSCH based on the DCI. The PUSCH may be transmitted in a specific BWP different from a current active BWP, based on the DCI. An FDRA field in the DCI may include K LSBs including information about an RB set. Based on the number N of RB sets configured in the current active BWP being different from the number M of RB sets configured in the specific BWP, the K bits may be changed to L bits.

According to another aspect of the present disclosure, a computer-readable storage medium including at least one computer program causing at least one processor to perform operations may be provided. The operations may include receiving DCI, and transmitting a PUSCH based on the DCI. The PUSCH may be transmitted in a specific BWP different from a current active BWP, based on the DCI. An FDRA field in the DCI may include K LSBs including information about an RB set. Based on the number N of RB sets configured in the current active BWP being different from the number M of RB sets configured in the specific BWP, the K bits may be changed to L bits.

In the methods and apparatuses, based on N being greater than M, the K bits may be decreased to the L bits by truncating L most significant bits (MSBs) among the K bits.

In the methods and apparatuses, based on N being less than M, the K bits may be increased to the L bits by padding zeroes before the K bits.

In the methods and apparatuses, based on the L bits, the RB set may be determined, and after a channel access procedure (CAP) is performed for the RB set, the PUSCH may be transmitted.

In the methods and apparatuses, the FDRA field may include the K bits and an MSB including information about an interlace allocation, and the PUSCH may be transmitted in an interlace based on the information about the interlace allocation.

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to an embodiment of the present disclosure, a communication apparatus may transmit an uplink channel more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
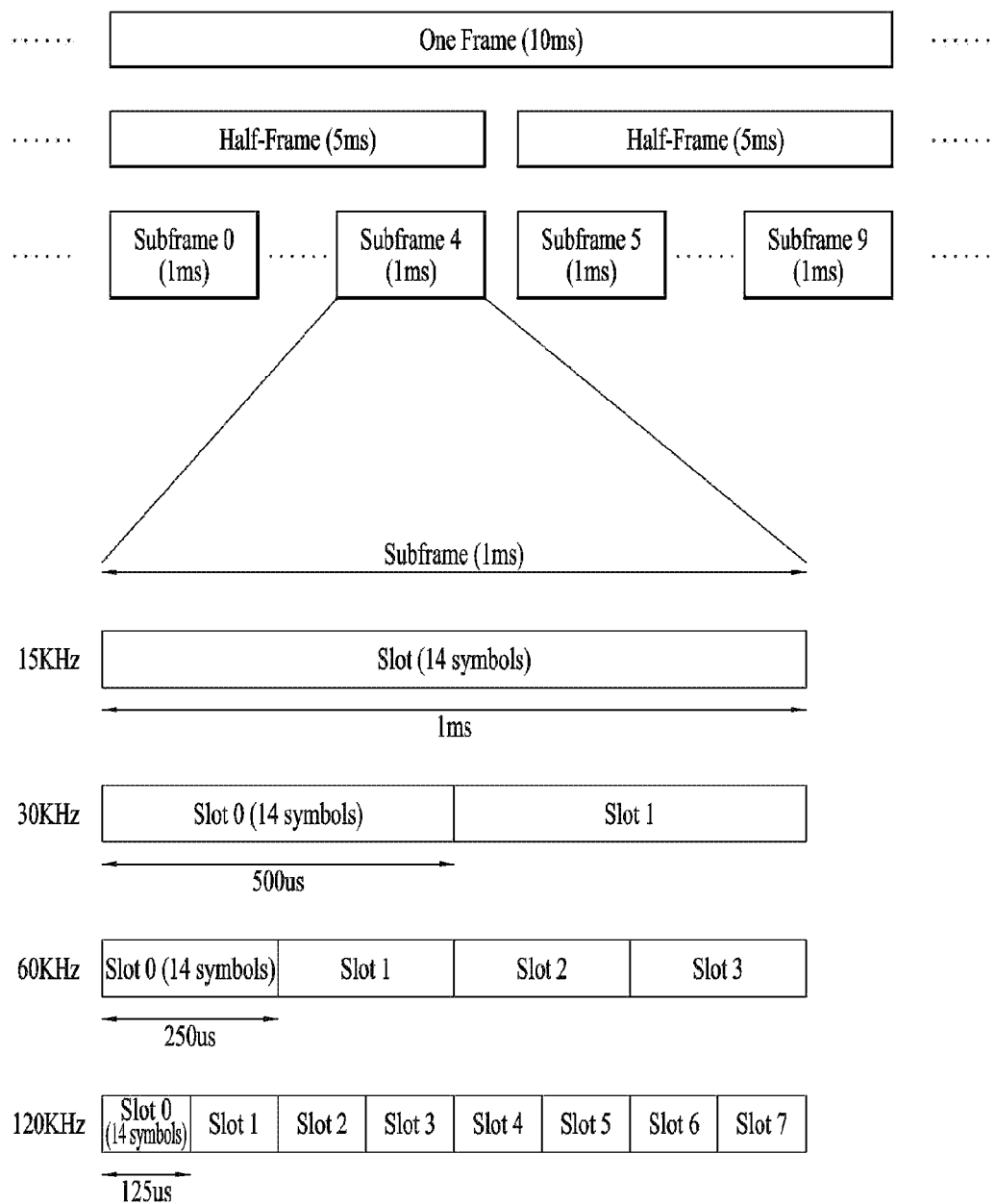
FIG. 1 illustrates a radio frame structure.

3GPP NR
   38.211: Physical channels and modulation
   38.212: Multiplexing and channel coding
   38.213: Physical layer procedures for control
   38.214: Physical layer procedures for data
   38.300: NR and NG-RAN Overall Description
   38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
| --- | --- | --- |
| FR1 | 450 MHz-7125 MHz | 15, 30, 60 kHz |
| FR2 | 24250 MHz-52600 MHz | 60, 120, 240 kHz |

Figure 2:
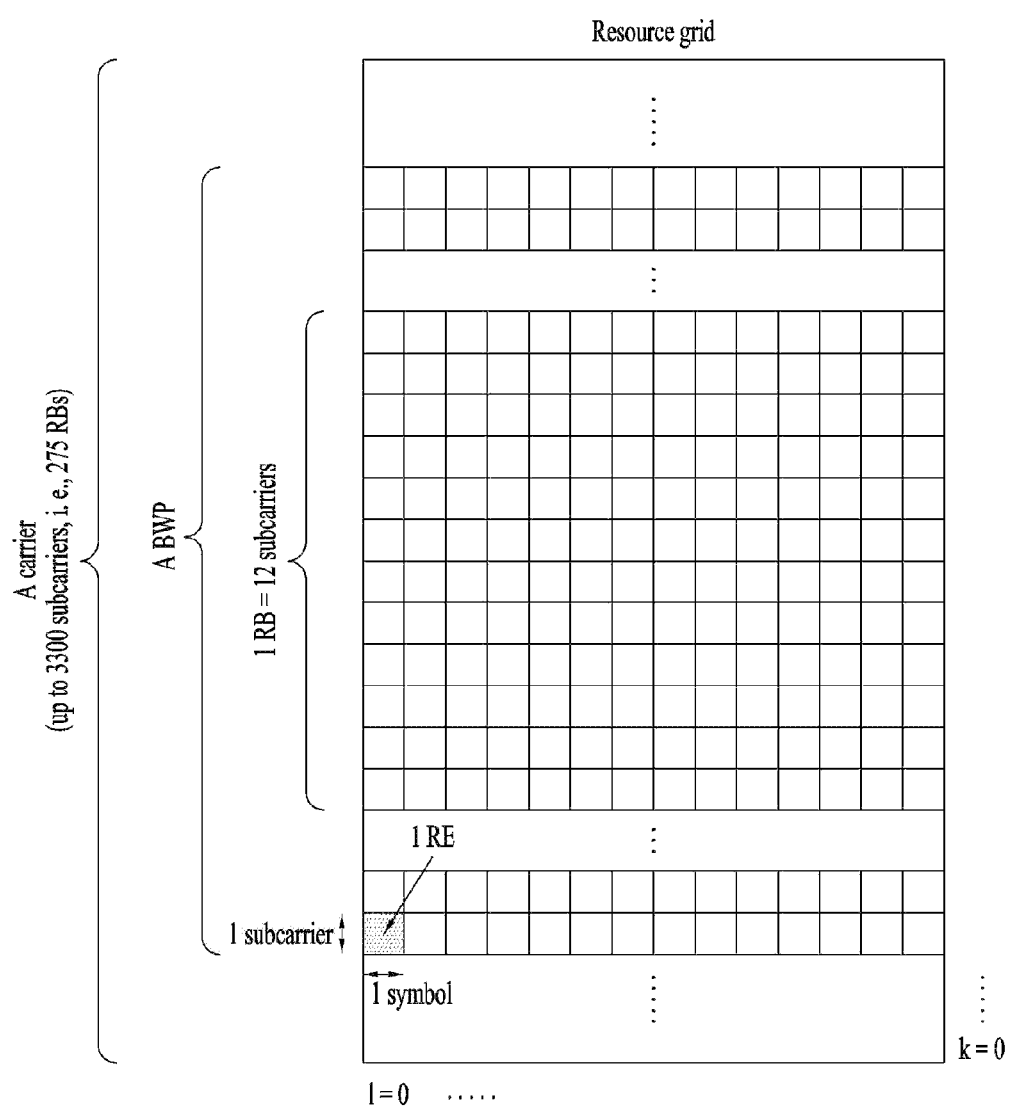
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

Figure 3:
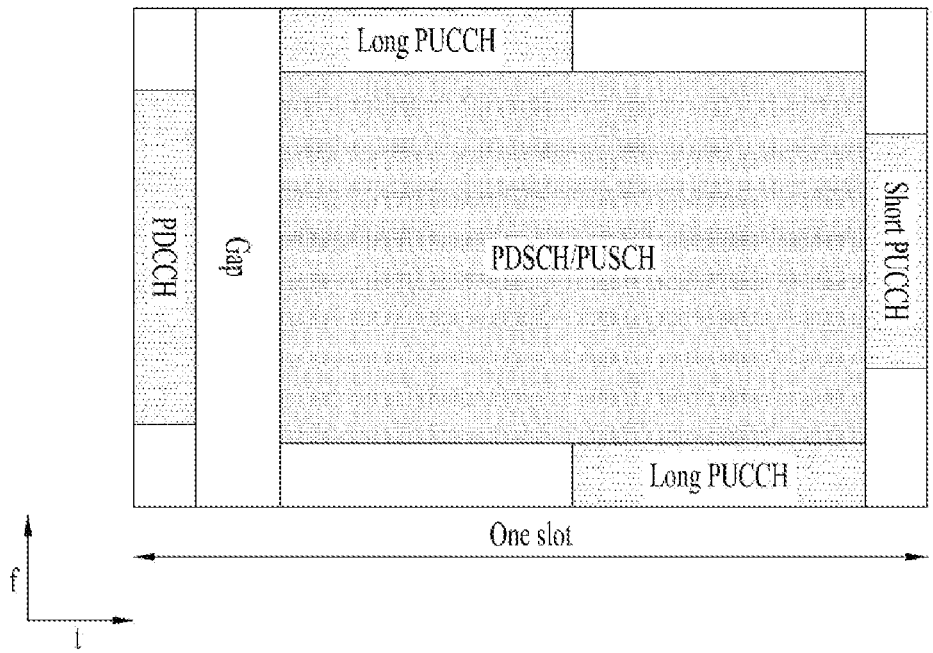
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

UL Physical Channels/Signals
(1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) PUCCH

A PUCCH may carry UCI. The UCI includes the following information.

Scheduling request (SR): The SR is information used to request a UL-SCH resource.

Hybrid automatic repeat and request acknowledgement) (HARQ-ACK): The HARQ-ACK is a signal in response to reception of a DL signal (e.g., PDCCH, SPS release PDCCH, etc.). The HARQ-ACK response may include positive ACK (ACK), negative ACK (HACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.

Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 4 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 4

| PUCCH format | Length in OFDM symbols $N_{symb}^{PUCCH}$ | Number of bits | Usage | Etc |
|---|---|---|---|---|
| 0 | 1-02 | ≤2 | HARQ, SR | Sequence selection |
| 1 | 4-14 | ≤2 | HARQ [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)
Supportable UCI payload size: up to K bits (e.g., K=2)
Number of OFDM symbols included in one PUCCH: 1 to X symbols (e.g., X=2)
Transmission structure: only a UCI signal is configured with no DM-RS, and a UCI state is transmitted by selecting and transmitting one of a plurality of sequences.

(1) PUCCH Format 1 (PF1)
Supportable UCI payload size: up to K bits (e.g., K=2)
Number of OFDM symbols included in one PUCCH: Y to Z symbols (e.g., Y=4 and Z=14)
Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).

(2) PUCCH Format 2 (PF2)
Supportable UCI payload size: more than K bits (e.g., K=2)
Number of OFDM symbols included in one PUCCH: 1 to X symbols (e.g., X=2)
Transmission structure: UCI and a DMRS (DM-RS) are configured/mapped in/to the same symbol based on frequency division multiplexing (FDM), and encoded UCI bits are transmitted by applying only an inverse fast Fourier transform (IFFT) thereto with no DFT.

(3) PUCCH Format 3 (PF3)
Supportable UCI payload size: more than K bits (e.g., K=2)
Number of OFDM symbols included in one PUCCH: Y to Z symbols (e.g., Y=4 and Z=14)
Transmission structure: UCI and DMRS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.

(4) PUCCH Format 4 (PF4 or F4)
Supportable UCI payload size: more than K bits (e.g., K=2)
Number of OFDM symbols included in one PUCCH: Y to Z symbols (e.g., Y=4 and Z=14)
Transmission structure: UCI and a DMRS are configured/mapped in/to different symbols based on TDM. The DFT is applied to encoded UCI bits with no multiplexing between UEs.

Figure 4:
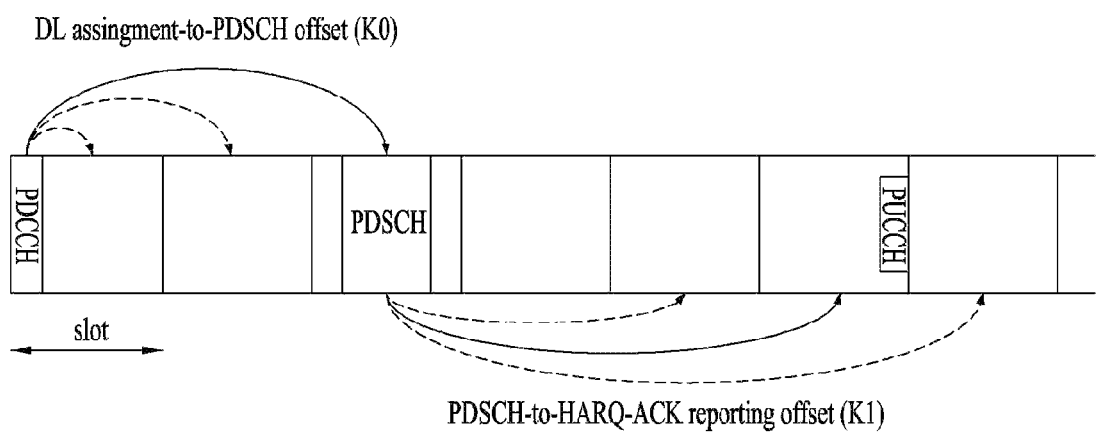
FIG. 4 illustrates an acknowledgment/negative acknowledgment (ACK/NACK) transmission process.

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g., OFDM symbol index) and length (e.g., the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

1. Wireless Communication System Supporting Unlicensed Band

Figure 5A:
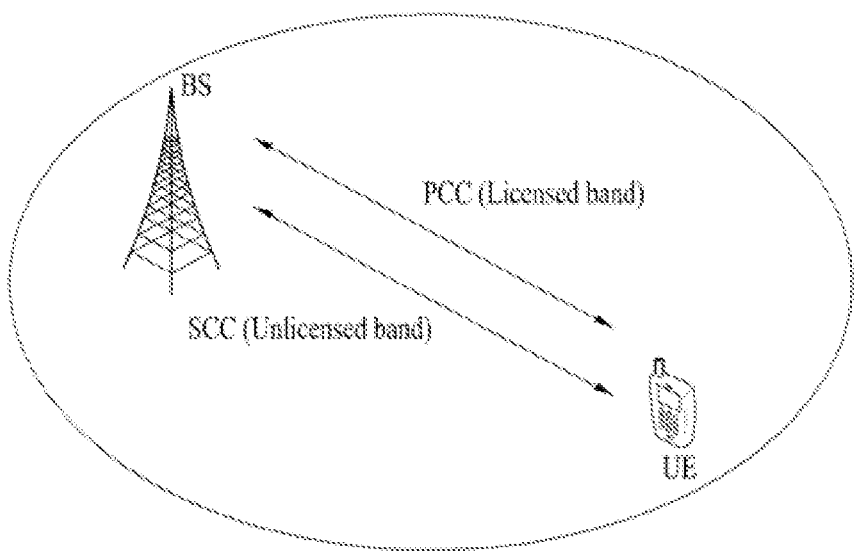
FIGS. 5A and 5B illustrate a wireless communication system supporting an unlicensed band.
Figure 5B:
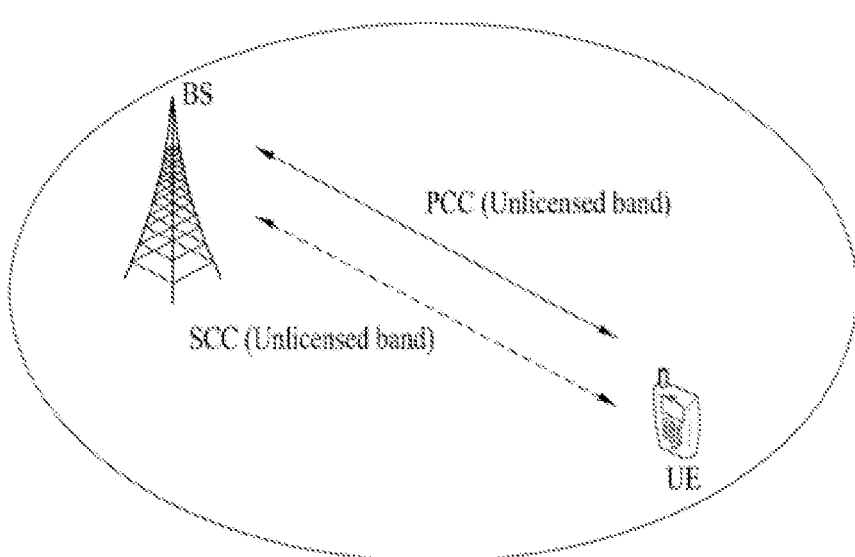

FIGS. 5A and 5B illustrate an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 5A, the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 5B. In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of $T_{sl}=9$ us. The BS or the UE senses the slot during a sensing slot duration. When power detected for at least 4 us within the sensing slot duration is less than an energy detection threshold $X_{thresh}$, the sensing slot duration $T_{sl}$ is be considered to be idle. Otherwise, the sensing slot duration $T_{sl}$ is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 6:
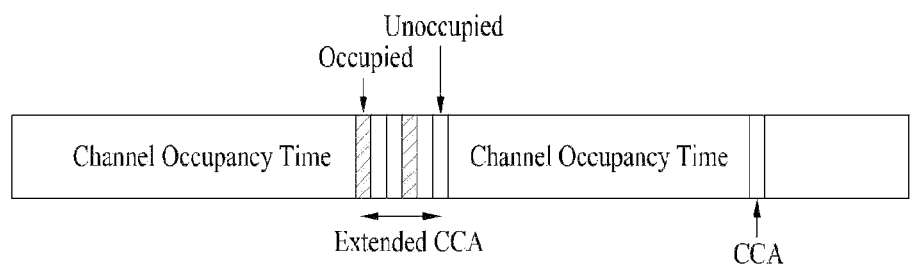
FIG. 6 illustrates an exemplary method of occupying resources in an unlicensed band.

FIG. 6 illustrates a resource occupancy method in a U-band. According to regional regulations for U-bands, a communication node in the U-band needs to determine whether a channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. The Wi-Fi standard (802.11ac) specifies a CCA threshold of −62 dBm for non-Wi-Fi signals and a CCA threshold of −82 dBm for Wi-Fi signals. When it is determined that the channel is idle, the communication node may start the signal transmission in a UCell. The sires of processes described above may be referred to as Listen-Before-Talk (LBT) or a channel access procedure (CAP). The LBT, CAP, and CCA may be interchangeably used in this document.

Specifically, for DL reception/UL transmission in a U-band, at least one of the following CAP methods to be described below may be employed in a wireless communication system according to the present disclosure.

DL Signal Transmission Method in U-band

The BS may perform one of the following U-band access procedures (e.g., CAPs) for DL signal transmission in a U-band.

(1) Type 1 DL CAP Method

In the Type 1 DL CAP, the length of a time duration spanned by sensing slots sensed to be idle before transmission(s) may be random. The Type 1 DL CAP may be applied to the following transmissions:

Transmission(s) initiated by the BS including (i) a unicast PDSCH with user plane data or (ii) a unicast PDCCH scheduling user plane data in addition to the unicast PDSCH with user plane data, or Transmission(s) initiated by the BS including (i) a discovery burst only or (ii) a discovery burst multiplexed with non-unicast information.

Figure 7:
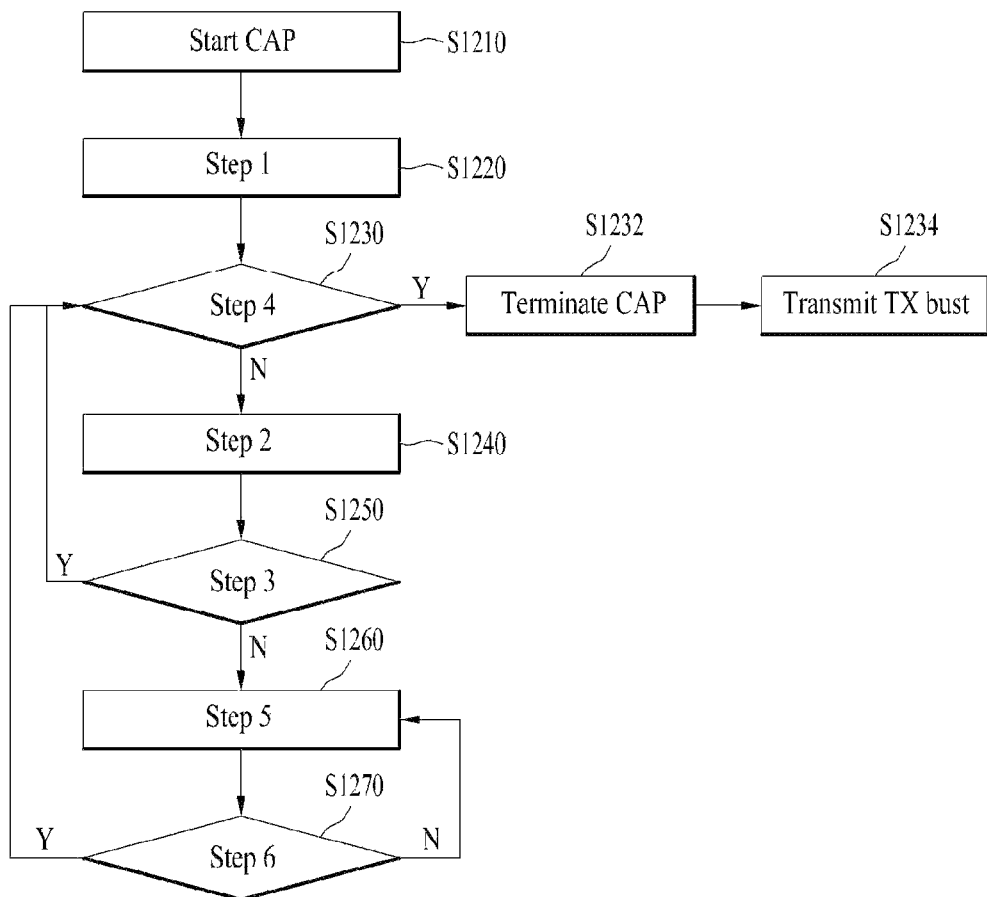
FIGS. 7 and 8 are flowcharts illustrating channel access procedures (CAPs) for signal transmission in an unlicensed band.

FIG. 7 is a flowchart illustrating CAP operations performed by a BS to transmit a DL signal in a U-band.

Referring to FIG. 7, the BS may sense whether a channel is idle for sensing slot durations of a defer duration $T_d$. Then, if a counter N is zero, the BS may perform transmission (S1234). In this case, the BS may adjust the counter N by sensing the channel for additional sensing slot duration(s) according to the following steps:

Step 1) (S1220) The BS sets N to $N_{init}$ (N=$N_{init}$), where $N_{init}$ is a random number uniformly distributed between 0 and $CW_p$. Then, step 4 proceeds.

Step 2) (S1240) If N>0 and the BS determines to decrease the counter, the BS sets N to N−1 (N=N−1).

Step 3) (S1250) The BS senses the channel for the additional sensing slot duration. If the additional sensing slot duration is idle (Y), step 4 proceeds. Otherwise (N), step 5 proceeds.

Step 4) (S1230) If N=0 (Y), the BS terminates the CAP (S1232). Otherwise (N), step 2 proceeds.

Step 5) (S1260) The BS senses the channel until either a busy sensing slot is detected within an additional defer duration $T_d$ or all the slots of the additional defer duration $T_d$ are detected to be idle.

Step 6) (S1270) If the channel is sensed to be idle for all the slot durations of the additional defer duration $T_d$ (Y), step 4 proceeds. Otherwise (N), step 5 proceeds.

Table 5 shows that $m_p$, a minimum contention window (CW), a maximum CW, a maximum channel occupancy time (MCOT), and an allowed CW size, which are applied to the CAP, vary depending on channel access priority classes.

TABLE 5

| Channel Access Priority Class (p) | $m_p$ | $CW_{min,p}$ | $CW_{max,p}$ | $T_{m\_cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63, 127, 255, 511, 1023} |
| 4 | 3 | 15 | 1023 | 8 or 10 ms | {15, 31, 63, 127, 255, 511, 1023} |

The defer duration $T_d$ is configured in the following order: duration $T_f$ (16 us)+$m_p$ consecutive sensing slot durations $T_{sl}$ (9 us). $T_f$ includes the sensing slot duration $T_{sl}$ at the beginning of the 16-us duration.

The following relationship is satisfied: $CW_{min,p}<=CW_p<=CW_{max,p}$. $CW_p$ may be initially configured by $CW_p=CW_{min,p}$ and updated before step 1 based on HARQ-ACK feedback (e.g., ACK or NACK) for a previous DL burst (e.g., PDSCH) (CW size update). For example, $CW_p$ may be initialized to $CW_{min,p}$ based on the HARQ-ACK feedback for the previous DL burst. Alternatively, $CW_p$ may be increased to the next highest allowed value or maintained as it is.

(2) Type 2 DL CAP Method

In the Type 2 DL CAP, the length of a time duration spanned by sensing slots sensed to be idle before transmission(s) may be determined. The Type 2 DL CAP is classified into Type 2A/2B/2C DL CAPs.

The Type 2A DL CAP may be applied to the following transmissions. In the Type 2A DL CAP, the BS may perform transmission immediately after the channel is sensed to be idle at least for a sensing duration $T_{short\_dl}$=25 us. Here, $T_{short\_dl}$ includes the duration $T_f$ (=16 us) and one sensing slot duration immediately after the duration $T_f$, where the duration $T_f$ includes a sensing slot at the beginning thereof.

- Transmission(s) initiated by the BS including (i) a discovery burst only or (ii) a discovery burst multiplexed with non-unicast information, or
- Transmission(s) by the BS after a gap of 25 us from transmission(s) by the UE within a shared channel occupancy.

The Type 2B DL CAP is applicable to transmission(s) performed by the BS after a gap of 16 us from transmission(s) by the UE within a shared channel occupancy time. In the Type 2B DL CAP, the BS may perform transmission immediately after the channel is sensed to be idle for $T_f$=16 us. $T_f$ includes a sensing slot within 9 us from the end of the duration. The Type 2C DL CAP is applicable to transmission(s) performed by the BS after a maximum of 16 us from transmission(s) by the UE within the shared channel occupancy time. In the Type 2C DL CAP, the BS does not perform channel sensing before performing transmission.

UL Signal Transmission Method in U-band

The UE may perform a Type 1 or Type 2 CAP for UL signal transmission in a U-band. In general, the UE may perform the CAP (e.g., Type 1 or Type 2) configured by the BS for UL signal transmission. For example, a UL grant scheduling PUSCH transmission (e.g., DCI formats 0_0 and 0_1) may include CAP type indication information for the UE.

(1) Type 1 UL CAP Method

In the Type 1 UL CAP, the length of a time duration spanned by sensing slots sensed to be idle before transmission(s) is random. The Type 1 UL CAP may be applied to the following transmissions.

- PUSCH/SRS transmission(s) scheduled and/or configured by the BS
- PUCCH transmission(s) scheduled and/or configured by the BS
- Transmission(s) related to a Random Access Procedure (RAP)

Figure 8:
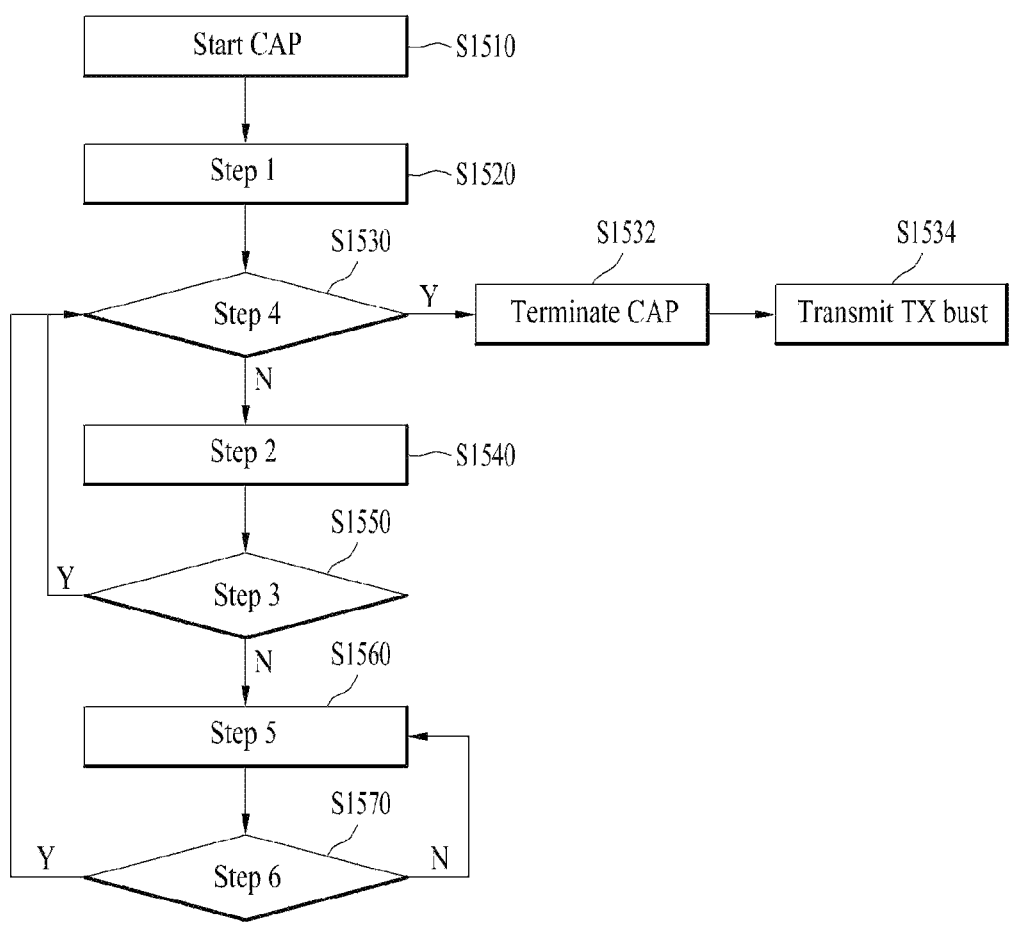

FIG. 8 is a flowchart illustrating CAP operations performed by a UE to transmit a UL signal.

Referring to FIG. 8, the UE may sense whether a channel is idle for sensing slot durations of a defer duration $T_d$. Then, if a counter N is zero, the UE may perform transmission (S1534). In this case, the UE may adjust the counter N by sensing the channel for additional sensing slot duration(s) according to the following steps:

Step 1) (S1520) The UE sets N to $N_{init}$ (N=$N_{init}$), where $N_{init}$ is a random number uniformly distributed between 0 and $CW_p$. Then, step 4 proceeds.

Step 2) (S1540) If N>0 and the UE determines to decrease the counter, the UE sets N to N-1 (N=N-1).

Step 3) (S1550) The UE senses the channel for the additional sensing slot duration. If the additional sensing slot duration is idle (Y), step 4 proceeds. Otherwise (N), step 5 proceeds.

Step 4) (S1530) If N=0 (Y), the UE terminates the CAP (S1532). Otherwise (N), step 2 proceeds.

Step 5) (S1560) The UE senses the channel until either a busy sensing slot is detected within an additional defer duration $T_d$ or all the slots of the additional defer duration $T_d$ are detected to be idle.

Step 6) (S1570) If the channel is sensed to be idle for all the slot durations of the additional defer duration $T_d$ (Y), step 4 proceeds. Otherwise (N), step 5 proceeds.

Table 6 shows that $m_p$, a minimum CW, a maximum CW, an MCOT, and an allowed CW size, which are applied to the CAP, vary depending on channel access priority classes.

TABLE 6

| Channel Access Priority Class (p) | $m_p$ | $CW_{min,p}$ | $CW_{max,p}$ | $T_{ulm\_cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63} |
| 4 | 7 | 15 | 1023 | 6 ms or 10 ms | {15, 31, 63, 127, 255, 511, 1023} |

The defer duration $T_d$ is configured in the following order: duration $T_f$ (16 us)+$m_p$ consecutive sensing slot durations $T_{sl}$(9 us). $T_f$ includes the sensing slot duration $T_{sl}$ at the beginning of the 16-us duration.

The following relationship is satisfied: $CW_{min,p}<=CW_p<=CW_{max,p}$. $CW_p$ may be initially configured by $CW_p=CW_{min,p}$ and updated before step 1 based on an explicit/implicit reception response for a previous UL burst (e.g., PUSCH) (CW size update). For example, $CW_p$ may be initialized to $CW_{min,p}$ based on the explicit/implicit reception response for the previous UL burst. Alternatively, $CW_p$ may be increased to the next highest allowed value or maintained as it is.

(2) Type 2 UL CAP Method

In the Type 2 UL CAP, the length of a time duration spanned by sensing slots sensed to be idle before transmission(s) may be determined. The Type 2 UL CAP is classified into Type 2A/2B/2C UL CAPs. In the Type 2A UL CAP, the UE may perform transmission immediately after the channel is sensed to be idle at least for a sensing duration $T_{short\_dl}$=25 us. Here, $T_{short\_dl}$ includes the duration $T_f$ (=16 us) and one sensing slot duration immediately after the duration $T_f$. In the Type 2A UL CAP, $T_f$ includes a sensing slot at the beginning thereof. In the Type 2B UL CAP, the UE may perform transmission immediately after the channel is sensed to be idle for the sensing duration $T_f$=16 us. In the Type 2B UL CAP, $T_f$ includes a sensing slot within 9 us from the end of the duration. In the Type 2C UL CAP, the UE does not perform channel sensing before performing transmission.

RB Interlace

Figure 9:
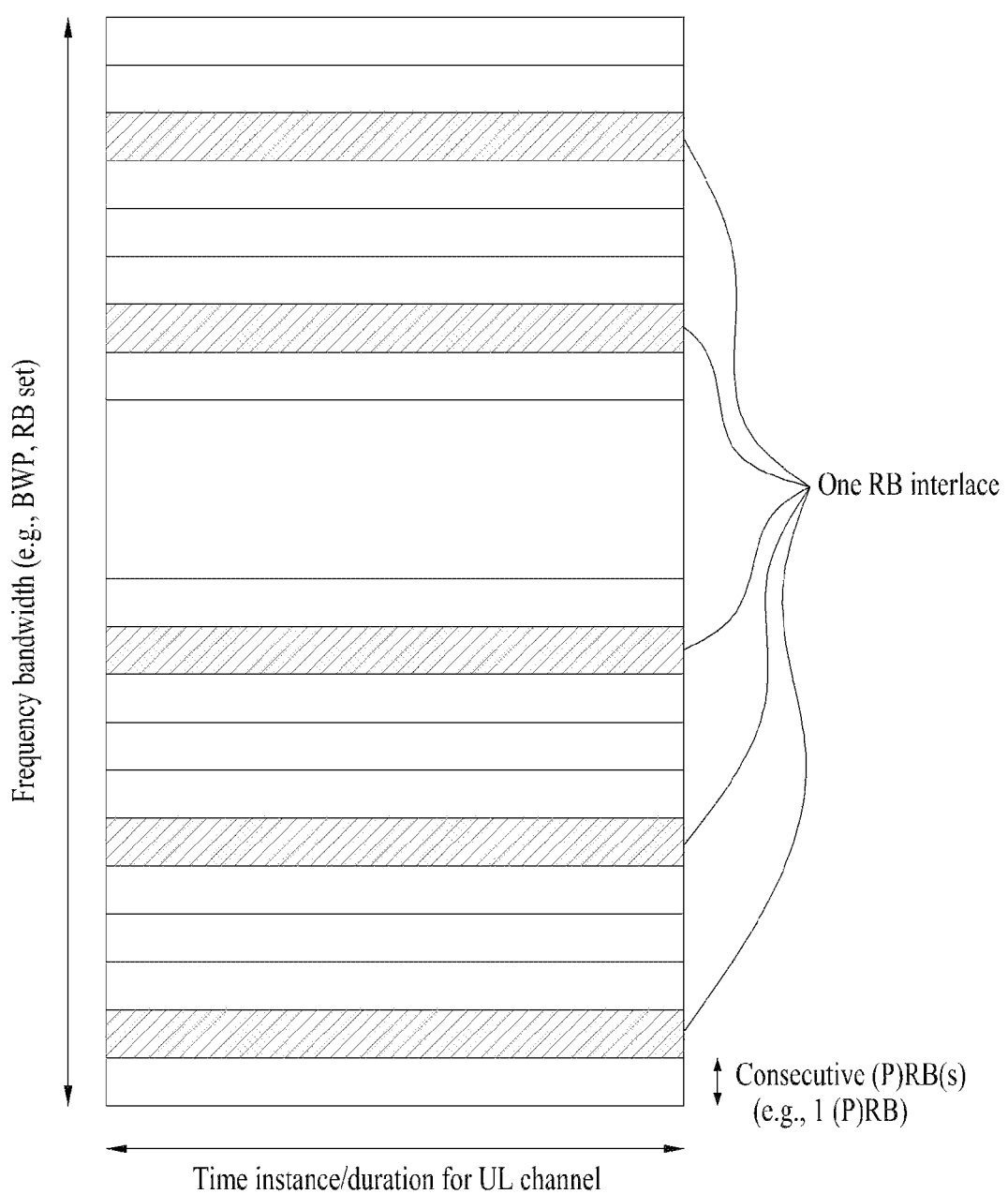
FIG. 9 illustrates a resource block (RB) interlace.

FIG. 9 illustrates an RB interlace. In a shared spectrum, a set of inconsecutive RBs (at the regular interval) (or a single RB) in the frequency domain may be defined as a resource unit used/allocated to transmit a UL (physical) channel/signal in consideration of regulations on occupied channel bandwidth (OCB) and power spectral density (PSD). Such a set of inconsecutive RBs is defined as the RB interlace (or interlace) for convenience.

Referring to FIG. 9, a plurality of RB interlaces (interlaces) may be defined in a frequency bandwidth. Here, the frequency bandwidth may include a (wideband) cell/CC/BWP/RB set, and the RB may include a PRB. For example, interlace #m∈{0, 1, ..., M−1} may consist of (common) RBs {m, M+m, 2M+m, 3M+m, ...}, where M represents the number of interlaces. A transmitter (e.g., UE) may use one or more interlaces to transmit a signal/channel. The signal/channel may include a PUCCH or PUSCH.

3. PUCCH Transmission in U-Band

The above descriptions (NR frame structure, RACH, U-band system, etc.) are applicable in combination with methods proposed in the present disclosure, which will be described later. Alternatively, the descriptions may clarify the technical features of the methods proposed in the present disclosure.

In addition, PRACH preamble design methods to be described later may be related to UL transmission, and thus, the methods may be equally applied to the above-described UL signal transmission methods in U-band systems. To implement the technical idea of the present disclosure in the corresponding systems, the terms, expressions, and structures in this document may be modified to be suitable for the systems.

For example, UL transmission based on the following PUCCH transmission methods may be performed on an L-cell and/or U-cell defined in the U-band systems.

As described above, the Wi-Fi standard (802.11ac) specifies a CCA threshold of −62 dBm for non-Wi-Fi signals and a CCA threshold of −82 dBm for Wi-Fi signals. In other words, a station (STA) or access point (AP) of the Wi-Fi system may transmit no signal in a specific band if the STA or AP receives a signal from a device not included in the Wi-Fi system in the specific band at a power of −62 dBm or higher.

In this document, the term 'U-band' may be interchangeably used with the terms 'shared spectrum'.

When a specific device (and/or node) transmits a signal in the shared spectrum, there may be restrictions in terms of the PSD. For example, according to the European Telecommunications Standards Institute (ETSI) regulation, signal transmission in a specific band needs to satisfy a PSD of 10 dBm/1 MHz. When the SCS is 15 kHz, if a PUSCH is transmitted in 5 PRBs (900 kHz), the maximum allowable power for the PUSCH may be about 10 dBm. In general, the maximum power of the UE is 23 dBm, and the maximum allowable power of 10 dBm is significantly lower than 23 dBm. If the UE transmits a UL signal at 10 dBm, the maximum UL coverage supported by the UE may be reduced. If the UE transmits a PUCCH in a wide frequency domain (F-domain) to increase the transmit power, it may help to solve the problem that the UL coverage becomes small.

As regulations in the shared spectrum, there may be restrictions in terms of the OCB. For example, when a specific device transmits a signal, the signal may need to occupy at least 80% of the system bandwidth. If the system bandwidth is 20 MHz, the signal transmitted by the specific device may need to occupy more than 16 MHz, which is 80% of 20 MHz.

As a PUCCH structure in consideration of the PSD and OCB related regulations, the above-described RB interlace structure may be used. Table 7 shows the total number of PRBs in a bandwidth for each SCS.

TABLE 7

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 180 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Figure 10:
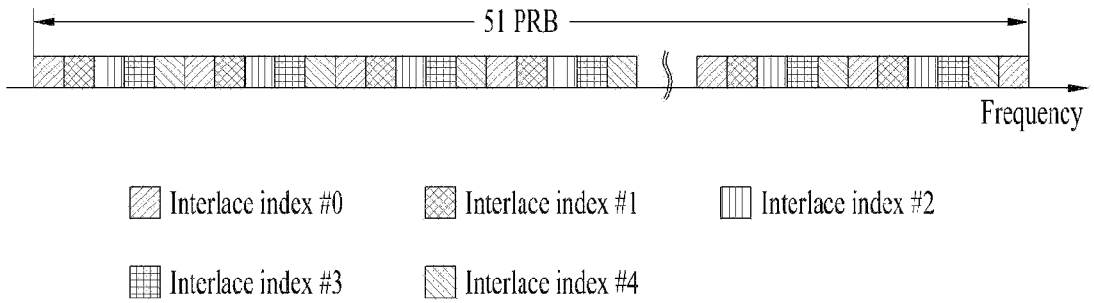
FIGS. 10 to 16 are a diagram illustrating uplink (UL) channel transmission according to the embodiments of the present disclosure.

Referring to Table 7, when the SCS is 30 kHz, the total number of PRBs in the 20 MHz bandwidth is 51. A total of five interlaces may be used in consideration of the 51 PRBs. Each interlace consists of 10 or 11 PRBs. The interval between PRBs included in each interlace is five PRBs (with respect to the starting point). FIG. 10 illustrates an example in which five interlaces are configured at 20 MHz in the 30 kHz SCS (interlace index #0 consists of 11 PRBs, and each of interlace indexes #1 to #4 consists of 10 PRBs). In this case, among the five interlaces, interlaces occupying smaller frequency bands may also occupy more than 80% of 20 MHz when a signal and/or channel is transmitted and received. For example, each of the interlaces with interlace indexes #1 to #4 also occupies 46 (PRBs)*30 (SCS)*12 (subcarriers)=16560 kHz, which exceeds 16000 kHz, i.e., 80% of 20 MHz.

Figure 11:
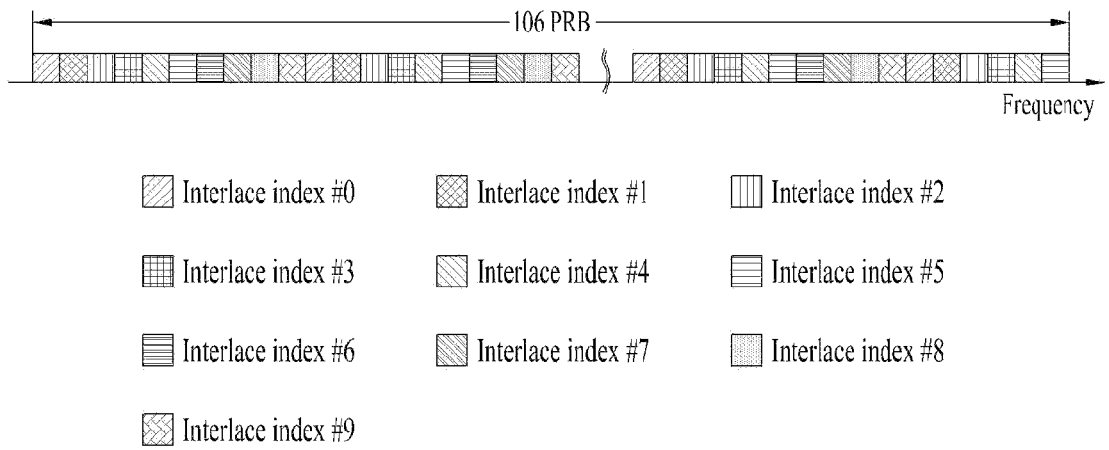

Referring to Table 7, when the SCS is 15 kHz, the total number of PRBs in the 20 MHz bandwidth is 106. A total of 10 interlaces may be used in consideration of the 106 PRBs. Each interlace consists of 10 or 11 PRBs. The interval between PRBs included in each interlace is 10 PRBs (with respect to the starting point). FIG. 11 illustrates an example in which 10 interlaces are configured at 20 MHz in the 15 kHz SCS (each of interlace indexes #0 to #5 consists of 11 PRBs, and each of interlace indexes #6 to #9 consists of 10 PRBs). In this case, among the 10 interlaces, interlaces occupying smaller frequency bands may also occupy more than 80% of 20 MHz while a signal and/or channel is transmitted and received. For example, each of the interlaces with interlace indexes #6 to #9 also occupies 91 (PRBs)*15 (SCS)*12 (subcarriers)=16380 kHz, which exceeds 16000 kHz, i.e., 80% of 20 MHz.

In the NR system, when the UE performs initial access in the U-band, the UE may not know the SCS of SS/PBCH blocks configured by the BS. Therefore, to reduce UE implementation complexity, it may be defined that the UE needs to use the 30 kHz SCS when performing initial access in the U-band.

In the conventional NR system, the SCS of CORESET #0 is indicated as either 15 kHz or 30 kHz by an MIB transmitted over a PBCH. However, in the NR U-band, it is defined that the SCS of CORESET #0 is always the same as the SCS of an SS/PBCH block (existing on the same carrier). For example, when the SCS of the SS/PBCH block is 30 kHz, the SCS of CORESET #0 becomes 30 kHz, and when the SCS of the SS/PBCH block is 15 kHz, the SCS of CORESET #0 becomes 15 kHz.

In the conventional NR system, the number of PRBs in CORESET #0 may be indicated by the MIB transmitted over the PBCH. However, in the NR U-band, the number of PRBs of CORESET #0 may be predetermined depending on the SCS of CORESET #0. That is, if the SCS of CORESET #0 is 30 kHz, the number of PRBs of CORESET #0 may be defined as 48. If the SCS of CORESET #0 is 15 kHz, the number of PRBs of CORESET #0 may be defined as 96.

In the conventional NR system, an initial active UL BWP is defined to be equal to the bandwidth of CORESET #0. In the U-band, if there are no special restrictions, the UE may operate by assuming that the size of the initial active UL BWP is equal to the number of RBs in CORESET #0 before an RRC setup.

For example, when the SCSs of the SS/PBCH block and CORESET #0 are 30 kHz, the size of the initial active UL BWP may be 48 PRBs. When the SCSs of the SS/PBCH block and CORESET #0 are 15 kHz, the size of the initial active UL BWP may be 96 PRBs. Assuming that the interlace structure defined in FIG. 10 is used as it is, if the UE intends to use some interlace indexes to transmit a signal/channel (during an initial access process), the UE may not satisfy OCB requirements. To satisfy the OCB requirements, when a specific node transmits a signal in the U-band, the signal needs to occupy more than 80% of an LBT sub-band bandwidth. Thus, when the UE transmits a signal/channel in a bandwidth of 20 MHz, the signal needs to occupy a bandwidth of 1.6 MHz or higher to satisfy the OCB requirements. In addition, the specific node needs to satisfy the OCB requirements at least once during a specific time window (e.g., one second). In the initial active UL BWP, the UL interlace may be used/targeted for/to a Msg3 PUSCH and/or an A/N PUCCH for Msg4.

Hereinafter, a method of newly configuring/setting/transmitting a UL interlace when a predefined interlace structure does not satisfy the OCB requirements on the assumption that the (initial) active UL BWP is less than 51 (51 PRBs) at the 30 kHz SCS and/or less than 106 (106 PRBs) at the 15 kHz SCS will be described.

Hereinafter, UE operations for performing UL transmission based on the UL interlace proposed in the present disclosure will be described.

(1) First, the UE may receive UL interlace configuration information for UL transmission from the BS. Here, the UL interlace configuration information may include the UL interlace indexes of UL interlaces that satisfy the defined OCB requirements for each SCS. (2) Second, the UE may determine at least one UL interlace based on the UL interlace configuration information. (3) Then, the UE may perform UL transmission to the BS based on the determined at least one UL interlace.

More specific details will be described with reference to the following embodiments.

3.1. Embodiment 1

Embodiment 1 relates to methods in which the BS indicates interlace indexes that satisfy specific conditions (e.g., OCB requirements) while maintaining the predefined interlace structure. The UE may transmit a signal and/or channel in the interlace with the indicated index.

Specifically, although the interlace structure described above with reference to FIGS. 10 to 11 is used, the BS may set interlaces satisfying the OCB requirements to available (valid) interlaces in the initial active UL BWP. That is, the BS may set interlace indexes satisfying the OCB requirements to interlace indexes available in the initial active UL BWP. In this case, other interlaces that do not satisfy the OCB requirements may be used by UEs that have already established RRC connections (only in specific cases where the OCB requirements do not need to be satisfied).

Figure 12:
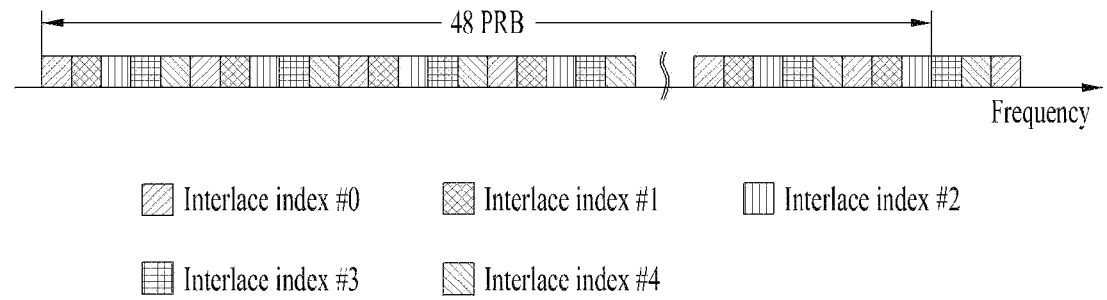

For example, if the SCS of CORESET #0 is 30 kHz, the initial active UL BWP is set to 48 PRBs. If the initial active UL BWP is 48 PRBs, each of the interlaces with indexes #0, #1, and #2 consists of 10 PRBs, and each of the interlaces with indexes #3 and #4 consists of 9 PRBs as shown in FIG. 12. That is, if the UE uses an interlace consisting of only 9 PRBs, the UE may transmit a signal and/or channel by occupying 41 (PRBs)*30 (SCS)*12 (subcarriers)=14760 kHz only so that the OCB requirements may not be satisfied. Here, 41 PRBs may be calculated as follows. For the interlace consisting of 9 PRBs, since the interval between PRBs is five PRBs (with respect to the starting point), one PRB may be included in the interlace for every five PRBs. Assuming that the first PRB (e.g., PRB index #3) of the interlace consisting of the 9 PRBs is included in an interlace with index #3, the total number of PRBs included in the interlace with index #3 among first 40 consecutive PRBs is 8. That is, PRBs with indexes #3, #8, #13, #18, #23, #28, #33, and #38 are included in the interlace with index #3. A PRB (i.e., PRB index #43) apart from five PRBs from the PRB with index #38 is also included in the interlace with index #3. Thus, the frequency band occupied by the interlace with index #3 is a total of 41 PRBs: PRBs with indexes #3 to #43. If the number of PRBs included in the interlace with index #3 is 10, the next PRB (i.e., PRB index #48) needs to be included, which is a value out of the bandwidth size of the initial active UL BWP. Therefore, the interlace with index #3 may consist of only the 9 PRBs.

Three interlaces (interlace indexes #0, #1, and #2) that satisfy the OCB requirements, each of which consists of 10 PRBs, may be used by UEs performing random access in the initial active UL BWP (i.e., UEs in the RRC-idle mode and/or RRC-connected mode). The three interlaces (interlace indexes #0, #1, and #2) that satisfy the OCB requirements, each of which consists of 10 PRBs, may be used by UEs that have established no RRC connection and/or no separate (UE-specific) UL BWP configuration. For example, the UEs that have established no RRC connection and/or no separate (UE-specific) UL BWP configuration may use the interlaces for Msg3 PUSCH transmission and/or HARQ-ACK feedback transmission for Msg4 reception. Two interlaces with indexes #3 and #4 that do not satisfy the OCB requirements, each of which consists of 9 PRBs, may be used by UEs that have established RRC connections (only in specific cases where the OCB requirements do not need to be satisfied). The two interlaces with indexes #3 and #4 that do not satisfy the OCB requirements may not be used by UEs performing random access. In addition, the two interlaces with indexes #3 and #4 that do not satisfy the OCB requirements may not be used by UEs that have established no RRC connection and/or no UL BWP configuration.

Figure 13:
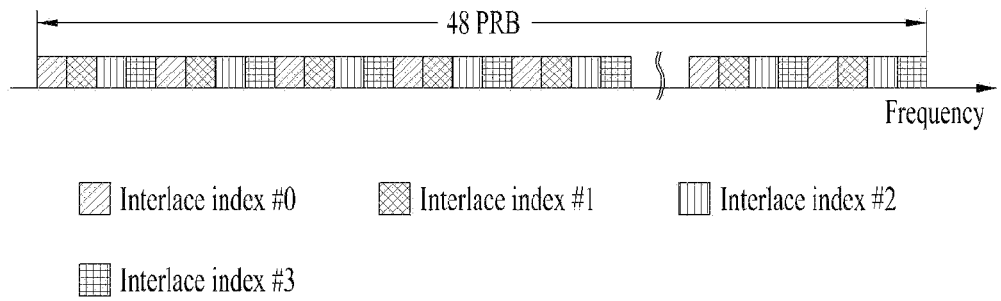

As another example, if the SCS of CORESET #0 is 15 kHz, the initial active UL BWP is set to 96 PRBs. In this case, each of the interlaces with indexes #0 to #5 consists of 10 PRBs, and each of the interlaces with indexes #6 to #9 consists of 9 PRBs as shown in FIG. 13. That is, if the UE uses an interlace consisting of only 9 PRBs, the UE may transmit a signal and/or channel by occupying 81 (PRBs)*15 (SCS)*12 (subcarriers)=14580 kHz only so that the OCB requirements may not be satisfied.

In this case, the 6 interlaces (interlace indexes #0 to #5) that satisfy the OCB requirements, each of which consists of 10 PRBs, may be used by UEs performing random access in the initial active UL BWP (i.e., UEs in the RRC-idle mode and/or RRC-connected mode). The 6 interlaces (interlace indexes #0 to #5) that satisfy the OCB requirements, each of which consists of 10 PRBs, may be set to interlaces available (valid) for UEs that have established no RRC connection and/or no separate (UE-specific) UL BWP configuration. For example, the UEs that have established no RRC connection and/or no separate (UE-specific) UL BWP configuration may use an interlace available for Msg3 PUSCH transmission and/or HARQ-ACK feedback transmission for Msg4 reception. Four interlaces (interlace indexes #6 to #9) that do not satisfy the OCB requirements, each of which consists of 9 PRBs, may be used by UEs that have established RRC connections (only in specific cases where the OCB requirements do not need to be satisfied). The four interlaces (interlace indexes #6 to #9) that do not satisfy the OCB requirements may not be used by UEs performing random access. In addition, the four interlaces (interlace indexes #6 to #9) that do not satisfy the OCB requirements may not be used by UEs that have established no RRC connection and/or no UL BWP configuration.

The method of Embodiment 1 will be further described in terms of signaling between the BS and UE. As described in the proposed method, the BS may inform the UE of one or multiple UL interlaces that satisfy the OCB requirements and instruct the UE to transmit the Msg3 PUSCH and/or A/N PUCCH for Msg4. That is, the UE may be configured to expect that the BS will indicate one or multiple UL interlaces that satisfy the OCB requirements. In other words, the UE may expect that an UL interlace that does not satisfy the OCB requirements will not be indicated for use in the Msg3 PUSCH or A/N PUCCH for Msg4. If the UL interlace that does not satisfy the OCB requirements is indicated, the UE may determine that an error occurs. The proposed method has a disadvantage in that the number of UL interlaces available for the initial access process is limited in terms of resource utilization of the BS.

In addition to the proposed method, the following method may also be considered. When the BS informs one UE of a plurality of UL interlaces including one or more UL interlaces that satisfy the OCB requirements, the UE may use the plurality of interlaces to transmit the Msg3 PUSCH and/or A/N PUCCH for Msg4. If the UE transmits one signal and/or channel in the plurality of indicated UL interlaces, the UE may satisfy the OCB requirements. In this case, the UE may expect that at least one UL interface satisfying the OCB requirements is indicated. For example, when one UE is configured with interlace index #0 and interlace index #4 of FIG. 12, the UE may perform UL transmission satisfying the OCB requirements by transmitting one channel in the two interlaces. When the UE transmits one channel in a plurality of UL interlaces, there is an advantage in that the number of UL interlaces available for the initial access process increases.

Additionally, the BS may inform one UE of a plurality of UL interlaces including only UL interlaces that do not satisfy the OCB requirements, and the UE may transmit the Msg3 PUSCH or A/N PUCCH for Msg4 in the indicated interlaces. To this end, the BS needs to first determine whether a combination of UL interlaces that do not satisfy the OCB requirements are capable of meeting the OCB requirements. If the combination of UL interlaces that do not satisfy the OCB requirements meet the OCB requirements, the BS may indicate the combination of UL interlaces to the UE. The UE may transmit the Msg3 PUSCH or A/N PUCCH for Msg4 in the indicated combination of UL interlaces. Since the UE performs UL transmission based on the interlaces that do not satisfy the OCB requirements, there is an advantage that the number of UL interlaces available for the initial access process is the largest, compared to the proposed methods.

The following UE operations may be added to the above-described proposal/configuration methods. In the current NR system, the BS may indicate a PUCCH resource list to the UE through higher layer signaling (e.g., PUCCH-Config) or a predefined configuration (e.g., Table 9.2.1-1 in TS 38.213). Thereafter, the BS may provide a PUCCH resource index to the UE in a 3-bit (or 4-bit) field of remaining minimum system information (RMSI) and/or DCI formats. Based on this, the following BS/UE operations may be defined in the NR-U system.

First, when the BS configures the PUCCH resource list, the BS may include only UL interlace indexes that satisfy the OCB requirements in the PUCCH resource list. That is, when the BS configures the PUCCH resource list, the BS may exclude UL interlace indexes that do not satisfy the OCB requirements from the PUCCH resource list. In particular, when the PUCCH resource list is configured, the PUCCH resource list may not be fully filled with only a single UL interlace and initial CS indexes.

In this case, (1) the BS may indicate PUCCH resources to the UE by leaving some indexes of the PUCCH resource list empty. The UE may expect that empty indexes are not indicated. If the BS indicates the empty indexes of the PUCCH resource list as PUCCH resource indexes, the UE may ignore the PUCCH resource indexes.

Alternatively, (2) the BS may configure the empty indexes of the PUCCH resource list as a combination of multiple UL interlaces. That is, the BS may configure a combination of multiple UL interlaces including at least one UL interlace satisfying the OCB requirements and add the combination of multiple UL interlaces to the PUCCH resource list. Alternatively, the BS may configure a combination of multiple UL interlaces among UL interlaces that do not satisfy the OCB requirements such that the combination of multiple UL interlaces satisfy the OCB requirements and add the combination of multiple UL interlaces to the PUCCH resource list. The UE may determine that all PUCCH resource indexes are meaningful and follow the instructions of the BS.

Alternatively, (3) when the BS fills the empty indexes of the PUCCH resource list, the BS may use a symbol next to the current PUCCH symbol. That is, the BS may fill the PUCCH resource list by configuring a single UL interlace satisfying the OCB requirements to be transmitted in symbol(s) next to the current PUCCH symbol.

Alternatively, (4) the BS may fill the empty indexes of the PUCCH resource list by reusing previously used PUCCH resources. That is, the same PUCCH resource may be indicated by a plurality of indexes. The UE may determine that all PUCCH resource indexes are meaningful and follow the instructions of the BS.

For example, if the SCS of CORESET #0 is 30 kHz, the initial UL BWP is set to 48 PRBs. In this case, each of the interlaces with indexes #0, #1, and #2 consists of 10 PRBs, and each of the interlaces with indexes #3 and #4 consists of only 9 PRBs as shown in FIG. 12. That is, the interlaces with indexes #3 and #4 do not satisfy the OCB requirements. If the BS intends to set 8 PUCCH resource indexes as PUCCH format 0, 6 PUCCH resource indexes among the 8 PUCCH resource indexes may be configured with combinations of three interlace indexes: #0, #1, and #2 and two starting CS offsets: #0 and #6. The remaining two PUCCH resource indexes may be configured by regarding a combination of interlace indexes #0 and #4 as one PUCCH resource and combining the combination with starting CS offsets: #0 and #6. Alternatively, the remaining two PUCCH resource indexes in the PUCCH resource list may be reconfigured from the first interlace after a symbol next to an OFDM symbol indicated by the BS.

Second, when the BS configures the PUCCH resource list, the BS may use all configured UL interlace indexes regardless of whether the OCB requirements are satisfied. That is, when the BS configures the PUCCH resource list, the BS may use all UL interlace indexes.

The following BS and UE operations may be considered. (1) The BS configures the PUCCH resource list by including all UL interlace indexes and indicates the configured PUCCH resource list to the UE. The UE determines whether the OCB requirements are satisfied based on the UL interlace indexes included in the PUCCH resource list. Thereafter, the UE may expect that a PUCCH resource index using only a UL interlace that does not satisfy the OCB requirements is not indicated. If the BS indicates the PUCCH resource index using only the UL interlace that does not satisfy the OCB requirements, the UE may ignore the PUCCH resource index.

The proposed method may be generalized as follows. When the number of bits indicating a PUCCH resource, which is signaled by a DCI field or CCE resource index in a PDCCH, is K, the maximum number of PUCCH resources configurable in a PUCCH resource set, which is configured by SIB/RMSI (based on a set of PUCCH resource related parameters), may be $N=2^K$. On the other hand, when N PUCCH resources are (virtually) configured based on the set of PUCCH resource related parameters (configured by the SIB/RMSI), if the number of resources that satisfy the OCB requirements is M and the number of resources that do not satisfy the OCB requirements is L (that is, N=M+L), a PUCCH resource set allocated/available to the UE may be configured as follows.

Method (1): A PUCCH resource set may be configured with a total of N PUCCH resources including both M PUCCH resources satisfying the OCB requirements and L PUCCH resources not satisfying the OCB requirements. In other words, the PUCCH resource set may include PUCCH resources corresponding to a total of N PUCCH resource indexes including M PUCCH resource indexes satisfying the OCB requirements and L PUCCH resource indexes not satisfying the OCB requirements. In this case, the UE may operate on the assumption that only the M PUCCH resource indexes satisfying the OCB requirements are indicated by the gNB (or only the M PUCCH resource indexes satisfying the OCB requirements are available/transmittable).

Method (2): A PUCCH resource set having a total of N PUCCH resource indexes may be configured by mapping only M PUCCH resources satisfying the OCB requirements to the N PUCCH resource indexes. In this case, the actual number of allocated PUCCH resources may be M. Some (e.g., L) PUCCH resource indexes may indicate the same PUCCH resources.

Method (3): A PUCCH resource set may be configured to have a total of N PUCCH resources including M PUCCH resources satisfying the OCB requirements and additional L PUCCH resources. In other words, the PUCCH resource set may include PUCCH resources corresponding to a total of N PUCCH resource indexes including M PUCCH resource indexes satisfying the OCB requirements and additional L PUCCH resource indexes. The additional PUCCH resource may be obtained by configuring a single PUCCH resource in the form of multiple interlaces (or interlaces having multiple indexes). Additionally/alternatively, the additional PUCCH resource may be a PUCCH resource configured by applying a value other than configured PUCCH resource related parameters (e.g., different starting symbol index).

Hereinafter, a PUCCH resource set and a PUCCH resource indicator (PRI) will be briefly reviewed before describing the methods proposed in the present disclosure in detail.

If the UE does not have a dedicated PUCCH resource configuration provided by PUCCH-ResourceSet in PUCCH-config, a PUCCH resource set is provided by pucch-ResourceCommon. The PUCCH resource set indicated by pucch-ResourceCommon may be determined based on the index of one row of Tables 8 to 34 for transmission of HARQ-ACK information on a PUCCH in an initial UL BWP of $N_{BW}^{size}$ RBs. The PUCCH resource set includes 16 resources. For each PUCCH resource, a PUCCH format, a first symbol for PUCCH transmission, a PUCCH duration, a PRB offset ($RB_{BWP}^{offset}$) for PUCCH transmission, and a CS index set for PUCCH transmission are configured. The UE transmits the PUCCH based on frequency hopping. An OCC with index 0 is used for PUCCH resources with PUCCH format 1 in Table 8. The UE transmits the PUCCH by using the same spatial domain transmission filter as for a PUSCH scheduled by an RAR UL grant, as described in clause 8.3 of 3GPP Rel-16 38.214. If the UE is not provided with pdsch-HARQ-ACK-Codebook, the UE generates at most one HARQ-ACK information bit.

If the UE needs to provide HARQ-ACK information in the PUCCH transmission in response to detection of DCI format 1_0 or DCI format 1_1, the UE determines a PUCCH resource. The index of the PUCCH resource is $r_{PUCCH}$, where $0 \leq r_{PUCCH} \leq 15$ and $$r_{PUCCH} = \left\lfloor \frac{2 \cdot n_{CCE,0}}{N_{CCE}} \right\rfloor + 2 \cdot \Delta_{PRI}.$$

$N_{CCE}$ is the number of CCEs in a CORESET for PDCCH reception with DCI format 1_0 or DCI format 1_1, $n_{CCE,0}$ is the index of a first CCE for the PDCCH reception, and $\Delta_{PRI}$ is the value of a PRI field in DCI format 10 or DCI format 1_1.

If $\lfloor r_{PUCCH}/8 \rfloor = 0$, the UE determines the PRB index of the PUCCH transmission in the first hop as $RB_{BWP}^{offset} + \lfloor r_{PUCCH}/N_{CS} \rfloor$ and the PRB index of the PUCCH transmission in the second hop as $N_{BWP}^{size} - 1 - RB_{BWP}^{offset} - \lfloor r_{PUCCH}/$ $N_{CS}\rfloor$, where $N_{CS}$ is the total number of initial CS indexes in a set of initial cyclic shift indexes. In addition, the UE determines the initial cyclic shift index in the initial cyclic shift index set as $r_{PUCCH}$ mod $N_{CS}$.

If $\lfloor r_{PUCCH}/8 \rfloor = 1$, the UE determines the PRB index of the PUCCH transmission in the first hop as $N_{BWP}^{size} - 1 - RB_{BWP}^{offset} - \lfloor r_{PUCCH} - 8/N_{CS} \rfloor$ and the PRB index of the PUCCH transmission in the second hop as $RB_{BWP}^{offset} + \lfloor r_{PUCCH} - 8/N_{CS} \rfloor$. The UE determines the initial cyclic shift index in the initial cyclic shift index set as $(r_{PUCCH} - 8)$ mod $N_{CS}$.

|x| is a symbol denoting the floor operation and means the greatest natural number or integer that does not exceed x.

TABLE 8

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The PRI may be included in DCI format 1_0 and DCI format 1_1. The PUCCH resource of the UE may be determined based on the PRI.

As defined in Table 9, PRI field values are mapped to values of a set of PUCCH resource indexes. The set of PUCCH resource indexes is provided by ResourceList for PUCCH resources from a set of PUCCH resources provided by PUCCH-RsourceSet including a maximum of 8 PUCCH resources.

TABLE 9

| PUCCH resource indicator | PUCCH resource |
|---|---|
| '000' | $1^{st}$ PUCCH resource provided by pucch-ResourceId obtained from the $1^{st}$ value of resourceList |
| '001' | $2^{nd}$ PUCCH resource provided by pucch-ResourceId obtained from the $2^{nd}$ value of resourceList |
| '010' | $3^{rd}$ PUCCH resource provided by pucch-ResourceId obtained from the $3^{rd}$ value of resourceList |
| '011' | $4^{th}$ PUCCH resource provided by pucch-ResourceId obtained from the $4^{th}$ value of resourceList |
| '100' | $5^{th}$ PUCCH resource provided by pucch-ResourceId obtained from the $5^{th}$ value of resourceList |
| '101' | $6^{th}$ PUCCH resource provided by pucch-ResourceId obtained from the $6^{th}$ value of resourceList |
| '110' | $7^{th}$ PUCCH resource provided by pucch-ResourceId obtained from the $7^{th}$ value of resourceList |
| '111' | $8^{th}$ PUCCH resource provided by pucch-ResourceId obtained from the $8^{th}$ value of resourceList |

The methods proposed in Embodiment 1 will be described in more detail. The following three major approaches may be considered.

[1] Approach 1: A table configured with 8 PUCCH resource sets is defined without configuring any cell-specific PRB (interlace) offsets. Each PUCCH resource set may include 16 PUCCH resources. One of the PUCCH resource sets may be indicated through 3-bit signaling in RMSI. Specifically, the PUCCH resource may be indicated by 3-bit PRI+1-bit CCE (=16 states).

[2] Approach 2: A table consisting of 16 PUCCH resource sets is defined with cell-specific PRB (interlace) offsets. Each PUCCH resource set includes 8 PUCCH resources. One of the PUCCH resource sets may be indicated through 4-bit signaling in RMSI. Specifically, the PUCCH resource may be indicated by a 3-bit PRI (=8 states).

[3] Approach 3: A table consisting of 16 PUCCH resource sets is defined with cell-specific PRB (interlace) offsets. Each PUCCH resource set includes 16 PUCCH resources. One of the PUCCH resource sets may be indicated through 4-bit signaling in RMSI. Specifically, the PUCCH resource may be indicated by 3-bit PRI+1-bit CCE (=16 states).

The RMSI may mean an SIB. The 3-bit PRI may be signaled in a specific field of DL grant DCI. The 1-bit CCE may be determined based on a CCE index used for transmission of a PDCCH carrying the DL grant DCI.

The RMSI may mean the SIB. The 3-bit PRI may be signaled in the specific field of the DL grant DCI. The 1-bit CCE may be determined based on the CCE index used for transmission of the PDCCH carrying the DL grant DCI.

Approach 1 may have the following three options in using UL interlace indexes in an initial UL BWP. Since the UE expects that the initial UL BWP will operate at the 30 kHz SCS, these options will be described based on the 30 kHz SCS.

(1) Option 1: Three interlace indexes (e.g., interlace indexes #0, #1, and #2 in FIG. 12) satisfying the OCB requirements may be used in the previously defined interlace structure.

(2) Option 2: Five interlace indexes may be used in the previously defined interlace structure, regardless of whether the OCB requirements are satisfied.

(3) Option 3: Four interlace indexes may be used irrespective of whether the previously defined interlace structure or an interlace structure to be newly introduced in Embodiment 2 is used.

According to Approach 1, a 3-bit RMSI signaling based PUCCH resource set table without no cell-specific interlace offsets may be defined as shown in Table 10. In NR-U, since a UL resource for transmission of PUCCH format 0/1 is one interlace consisting of multiple PRBs rather than one PRB, no cell-specific PRB offset may need to be configured in consideration of the effects of interference between adjacent cells. Therefore, an existing PUCCH resource set table based on 4-bit RMSI signaling may be modified into the 3-bit RMSI signaling based PUCCH resource set table as shown in Table 10.

TABLE 10

| Index | PUCCH format | First symbol | Number of symbols | Set of initial CS indexes |
|---|---|---|---|---|
| 0 | 0 | 12 | 2 | {0, 3} |
| 1 | 0 | 12 | 2 | {0, 4, 8} |
| 2 | 1 | 10 | 4 | {0, 6} |
| 3 | 1 | 10 | 4 | {0, 3, 6, 9} |
| 4 | 1 | 4 | 10 | {0, 6} |
| 5 | 1 | 4 | 10 | {0, 3, 6, 9} |
| 6 | 1 | 0 | 14 | {0, 6} |
| 7 | 1 | 0 | 14 | {0, 3, 6, 9} |

In this case, according to the number of interlaces defined in each option, methods and operations of indicating PUCCH resources with 3-bit PRI+1-bit CCE (=16 states) may be configured as follows. The capacity of OCC indexes described in this document may be based on the number of PUCCH symbols. That is, if the number of symbols is 14, a maximum of 7 OCC indexes may be used. If the number of symbols is 10, a maximum of five OCC indexes may be used. If the number of symbols is 4, a maximum of two OCC indexes may be used.

Proposal 1) Cases in which among the five interlaces of FIG. 12, three interlaces are used as in Option 1 will be described.

A. For (RMSI values) indexes 3, 5, and 7 of Table 10, a combination of one of the three interlace indexes and one of four CS indexes (i.e., 0, 3, 6, and 9) is indicated. OCC index #0 is applied. Therefore, 3*4=12 states are configured for PUCCH resources. Since the number of PUCCH resources ($r_{PUCCH}$) needs to be 16, the remaining four states are used to indicate one of four PUCCH resources based on other OCC indexes (e.g., #1). For example, a combination of one interlace (e.g., interlace index #0) and one of four CSs is indicated. OCC index #1 is applied to the remaining four states.

B. For (RMSI values) indexes 4 and 6 of Table 10, a combination of one of the three interlace indexes, one of two CS indexes (i.e., 0 and 6), and one of two OCC indexes (e.g., indexes 0 and 1) is indicated. Therefore, 3*2*2=12 states are configured for PUCCH resources. The remaining four states are used to indicate one of four PUCCH resources based on other OCC indexes (e.g., #2). For example, a combination of one of two interlace indexes (e.g., interlace indexes #0 and #1) and one of two CS indexes is indicated. OCC index #2 is applied to the remaining four states.

C. For (RMSI value) index 2 of Table 10, a combination of one of the three interlace indexes, one of two CS indexes (i.e., 0 and 6), and one of two OCC indexes (e.g., indexes 0 and 1) is indicated. The starting symbol index is 10. Therefore, 3*2*2=12 states are configured for PUCCH resources. The remaining four states are used to indicate one of four PUCCH resources based on other starting symbols (e.g., index 4 or 5). For example, a combination of one of two interlace indexes (e.g., interlace indexes #0 and #1) and one of two CS indexes is indicated. If the combination of one of the two interlace indexes and one of the two CS indexes is indicated, OCC index #0 is applied. As another example, a combination of one of two CS indexes (i.e., 0 and 6) and one of two OCC indexes (e.g., #0 and #1) may be indicated. If the combination of one of the two CS indexes and one of the two OCC indexes is indicated, interlace index #0 is applied.

D. For (RMSI value) index 0 of Table 10, a combination of one of the three interlace indexes, one of two CS indexes (i.e., 0 and 3) and one of two starting symbols (e.g., indexes 12 and 8 or 9) is indicated. Therefore, 3*2*2=12 states are configured for PUCCH resources. The remaining four states may be used to indicate one of four PUCCH resources based on other starting symbols (e.g., index 4 or 6). For example, a combination of one of two interlace indexes (e.g., interlace indexes #0 and #1) and one of two CS indexes is indicated. Starting symbol index #4 or #6 is applied to the remaining four states.

E. For (RMSI value) index 1 of Table 10, a combination of one of the three interlace indexes and one of three CS indexes (i.e., 0, 4, and 8) is indicated. Therefore, 3*3=9 states are configured for PUCCH resources. The remaining 7 states are used to indicate one of 7 PUCCH resources based on other starting symbols (e.g., index 8 or 9). For example, a combination of one of the three interlace indexes (e.g., interlace indexes #0, #1, and #2) and one of three CS indexes is indicated, but for a specific interlace index (e.g., #0), only one CS (e.g., #0) may be used. The two CS indexes (e.g., #4 and #8) may be used for the two interlace indexes (e.g., #1 and #2) except for the specific interlace index. Starting symbol index 8 or 9 is applied to the remaining 7 states.

Proposal 2) Cases in which all five interlaces of FIG. 12 are used as in Option 2 will be described.

A. For (RMSI values) indexes 3, 5, and 7 of Table 10, a combination of one of the five interlace indexes and one of four CS indexes (i.e., 0, 3, 6, and 9) is indicated. OCC index #0 is applied. Therefore, 5*4=20 states are configured for PUCCH resources. Since the number of PUCCH resources ($r_{PUCCH}$) needs to be 16, four extra states are excluded from the configuration of PUCCH resources. For example, combinations of one interlace (e.g., interlace index #4) and four CSs are excluded.

B. For (RMSI values) indexes 2, 4, and 6 of Table 10, a combination of one of the five interlace indexes and one of two CS indexes (i.e., 0 and 6) is indicated. OCC index #0 is applied. Therefore, 5*2=10 states are configured for PUCCH resources. The remaining 6 states are used to indicate one of 6 PUCCH resources based on other OCC indexes (e.g., #1). For example, a combination of three interlace indexes (e.g., interlace indexes #0, #1, and #2) and one of two CS indexes is indicated. OCC index #1 is applied to the remaining 6 states.

C. For (RMSI value) index 0 of Table 10, a combination of one of the five interlace indexes and one of two CS indexes (i.e., 0 and 3) is indicated. Starting symbol index 12 is applied. Therefore, 5*2=10 states are configured for PUCCH resources. The remaining 6 states are used to indicate one of 6 PUCCH resources based on other starting symbols (e.g., index 8 or 9). For example, a combination of one of three interlace indexes (e.g., interlace indexes #0, #1, and #2) and one of the two CS indexes is indicated. Starting symbol index 8 or 9 is applied to the remaining 6 states.

D. For (RMSI value) index 1 of Table 10, a combination of one of the five interlace indexes and one of three CS indexes (i.e., 0, 4, and 8) is indicated. Starting symbol index 12 is applied. Therefore, 5*3=15 states are configured for PUCCH resources. The remaining one state is used to indicate one PUCCH resource based on other starting symbols (e.g., index 8 or 9). For example, a combination of one interlace index (e.g., interlace index #0) and one CS (e.g., #0) is indicated. Starting symbol index 8 or 9 is applied to the remaining one state.

Proposal 3) Cases in which four interlace indexes are used as in Option 3 will be described.

A. For (RMSI values) indexes 3, 5, and 7 of Table 10, a combination of one of the four interlace indexes and one of four CS indexes (i.e., 0, 3, 6, and 9) is indicated. OCC index #0 is applied. Therefore, 4*4=16 states are configured for PUCCH resources.

B. For (RMSI values) indexes 2, 4, and 6 of Table 10, a combination of one of the four interlace indexes, one of two CS indexes (i.e., 0 and 6), and one of two OCC indexes (e.g., 0 and 1) is indicated. Therefore, 4*2*2=16 states are configured for PUCCH resources.

C. For (RMSI value) index 0 of Table 10, a combination of one of the four interlace indexes, one of two CS indexes (i.e., 0 and 3), and one of two starting symbol indexes (e.g., 12 and 8 or 9) is indicated. Therefore, 4*2*2=16 states are configured for PUCCH resources.

D. For (RMSI value) index 1 of Table 10, a combination of one of the four interlace indexes and one of three CS indexes (i.e., 0, 4, and 8) is indicated. Starting symbol index 12 is applied. Therefore, 4*3=12 states are configured for PUCCH resources. The remaining four states are used to indicate one of four PUCCH resources based on other starting symbols (e.g., index 8 or 9). For example, a combination of one of the four interlace indexes and one CS (e.g., #0) is indicated. Starting symbol index 8 or 9 is applied to the remaining four states.

As another method, PUCCH resource sets based on combinations of Table 11 may be at least included in an RMSI signaling based PUCCH resource set table. When one of the combinations of Table 11 is configured through RMSI signaling, Method D or E of Proposal 1), Method of C or D of Proposal 2), and/or Method of C or D of Proposal 3) may be applied to indicate a specific PUCCH resource in a PUCCH resource set based on the combination.

TABLE 11

| PUCCH format | First symbol | Number of symbols | Set of initial CS indexes |
|---|---|---|---|
| 0 | 12 | 2 | {0, 3} |
| 0 | 12 | 2 | {0, 4, 8} |

As another method, PUCCH resource sets based on combinations of Table 12 may be at least included in an RMSI signaling based PUCCH resource set table. When one of the combinations of Table 12 is configured through RMSI signaling, Method A or C of Proposal 1), Method A or B of Proposal 2), and/or Method A or B of Proposal 3) may be applied to indicate a specific PUCCH resource in a PUCCH resource set based the combination.

TABLE 12

| PUCCH format | First symbol | Number of symbols | Set of initial CS indexes |
|---|---|---|---|
| 1 | 10 | 4 | {0, 6} |
| 1 | 10 | 4 | {0, 3, 6, 9} |

As another method, PUCCH resource sets based on combinations of Table 13 may be at least included in an RMSI signaling based PUCCH resource set table. When one of the combinations of Table 13 is configured through RMSI signaling, Method A or B of Proposal 1), Method A or B of Proposal 2), and/or Method A or B of Proposal 3) may be applied to indicate a specific PUCCH resource in a PUCCH resource set based the combination.

TABLE 13

| PUCCH format | First symbol | Number of symbols | Set of initial CS indexes |
|---|---|---|---|
| 1 | 4 | 10 | {0, 6} |
| 1 | 4 | 10 | {0, 3, 6, 9} |

As another method, PUCCH resource sets based on combinations of Table 14 may be at least included in an RMSI signaling based PUCCH resource set table. When one of the combinations of Table 14 is configured through RMSI signaling, Method A or B of Proposal 1), Method A or B of Proposal 2), and/or Method A or B of Proposal 3) may be applied to indicate a specific PUCCH resource in a PUCCH resource set based the combination.

TABLE 14

| PUCCH format | First symbol | Number of symbols | Set of initial CS indexes |
|---|---|---|---|
| 1 | 0 | 14 | {0, 6} |
| 1 | 0 | 14 | {0, 3, 6, 9} |

Next, according to Approach 2 described above, a 4-bit RMSI signaling based PUCCH resource set table to which cell-specific interlace (index) offsets are added may be defined as shown in Table 15. In NR-U, since a UL resource for transmission of PUCCH formats 0 and 1 is changed to one interlace consisting of multiple PRBs rather than one PRB, the 4-bit RMSI signaling based PUCCH resource set table may be configured by changing PRB offsets of the conventional system to interlace offsets. In Approach 2, since a PUCCH resource is indicated by a 3-bit PRI, a total of 8 states may be configured for PUCCH resources in one PUCCH resource set.

TABLE 15

| Index | PUCCH format | First symbol | Number of symbols | Cell-specific interlace offset | Set of initial CS indexes |
|---|---|---|---|---|---|
| 0 | 0 | 12 | 2 | 0 | {0, 3} |
| 1 | 0 | 12 | 2 | 2 | {0, 3} |
| 2 | 0 | 12 | 2 | 0 | {0, 4, 8} |
| 3 | 0 | 12 | 2 | 2 | {0, 4, 8} |
| 4 | 1 | 10 | 4 | 0 | {0, 6} |
| 5 | 1 | 10 | 4 | 2 | {0, 6} |
| 6 | 1 | 10 | 4 | 0 | {0, 3, 6, 9} |
| 7 | 1 | 10 | 14 | 2 | {0, 3, 6, 9} |
| 8 | 1 | 4 | 10 | 0 | {0, 6} |
| 9 | 1 | 4 | 10 | 2 | {0, 6} |
| 10 | 1 | 4 | 10 | 0 | {0, 3, 6, 9} |
| 11 | 1 | 4 | 10 | 2 | {0, 3, 6, 9} |
| 12 | 1 | 0 | 14 | 0 | {0, 6} |
| 13 | 1 | 0 | 14 | 2 | {0, 6} |
| 14 | 1 | 0 | 14 | 0 | {0, 3, 6, 9} |
| 15 | 1 | 0 | 14 | 2 | {0, 3, 6, 9} |

Based on Table 15, PUCCH resource sets may be configured according to Option 3 (where four interlace indexes are used) among Options 1 to 3 described above. In particular, an actual PUCCH interlace index to be used by the UE may be determined by the sum of a value indicated by a cell-specific interlace offset (or cell-specific interlace index offset) and a value indicated by an interlace index offset (or UE-specific interlace index offset) to be described in Proposal 4) or 5). For example, the UE-specific interlace index offset may be defined as 0 or 1. When the cell-specific interlace index offset is 0, if it is defined in Proposal 4) or Proposal 5) below that two interlace indexes (or two UE-specific interlace indexes) are used, the UE may use interlace indexes #0 and #1. For the use of interlace indexes #0 and #1, the UE-specific interlace index offset may be indicated as 0 or 1. When the cell-specific interlace index offset is 2, if it is defined in Proposal 4) or Proposal 5) that two interlace indexes (or two UE-specific interlace indexes) are used, the UE may use interlace indexes #2 and #3. For the use of interlace indexes #2 and #3, the UE-specific interlace index offset may be indicated as 0 or 1.

Proposal 4) Cases in which four interlace indexes are used as in Option 3 based on Table 15 will be described.

A. For (RMSI values) indexes 6, 7, 10, 11, 14, and 15 of Table 15, a combination of one of two interlace indexes (offset 0 or 1) and one of four CS indexes (i.e., 0, 3, 6, and 9) is indicated. OCC index #0 is applied. Therefore, 2*4=8 states are configured for PUCCH resources.

B. For (RMSI values) indexes 4, 5, 8, 9, 12, and 13 of Table 15, a combination of one of two interlace indexes (offset 0 or 1), one of two CS indexes (i.e., 0 and 6), and one of two OCC indexes (e.g., 0 and 1) is indicated. Therefore, 2*2*2=8 states are configured for PUCCH resources.

C. For (RMSI values) indexes 0 and 1 of Table 15, a combination of one of two interlace indexes (offset 0 or 1), one of two CS indexes (i.e., 0 and 3), and one of two starting symbol indexes (e.g., 12 and 8 or 9) is indicated. Therefore, 2*2*2=8 states are configured.

D. For (RMSI values) indexes 2 and 3 of Table 15, a combination of one of two interlace indexes (offset 0 or 1) and one of three CS indexes (i.e., 0, 4, and 8) is indicated. Starting symbol index 12 is applied. Therefore, 2*3=6 states are set configured for PUCCH resources. Since a total of 8 states need to be configured for the PUCCH resources, the remaining two states are used to indicate one of two PUCCH resources based on other starting symbols (e.g., index 8 or 9). For example, a combination of one of the two interlace indexes and one CS (e.g., #0) is indicated. Starting symbol index 8 or 9 may be applied to the remaining two states.

As an additional method, it may be considered that PUCCH resources are indicated by 3-bit PRI+1-bit CCE based on Table 15. Since PUCCH resources are indicated by a total of four bits, a total of 16 states may be configured for PUCCH resources in one PUCCH resource set. The 16 states may be configured as described in Proposal 5).

Proposal 5) Cases in which PUCCH resources are indicated by 3-bit PRI+1-bit CCE and four interlace indexes are used as in Option 3 will be described.

A. For (RMSI values) indexes 6, 7, 10, 11, 14, and 15 of Table 15, a combination of one of two interlace indexes (offset 0 or 1), one of four CS indexes (i.e., 0, 3, 6, and 9), and one of two OCC indexes (e.g., 0 and 1) is indicated. Therefore, 2*4*2=16 states are configured for PUCCH resources.

B. For (RMSI values) indexes 8, 9, 12, and 13 of Table 15, a combination of one of two interlace indexes (offset 0 or 1), one of two CS indexes (i.e., 0 and 6), and one of four OCC indexes (e.g., 0, 1, 2, and 3) is indicated. Therefore, 2*2*4=16 states are configured for PUCCH resources.

C. For (RMSI values) indexes 4 and 5 of Table 15, a combination of one of two interlace indexes (offset 0 or 1), one of the two CS indexes (i.e., 0 and 6), one of two OCC indexes (e.g., 0 and 1), and one of two starting symbols (e.g., indexes 10 and 4 or 5) is indicated. Therefore, 2*2*2*2=16 states are configured for PUCCH resources.

D. For (RMSI values) indexes 0 and 1 of Table 15, a combination of one of two interlace indexes (offset 0 or 1), one of two CS indexes (i.e., 0 and 3), and one of four starting symbol indexes (e.g., 12, 8 or 9, 4 or 6, and 0 or 3) is indicated. Therefore, 2*2*4=16 states are configured for PUCCH resources.

E. For (RMSI values) indexes 2 and 3 of Table 15, a combination of one of two interlace indexes (offset 0 or 1), one of three CS indexes (i.e., 0, 4, and 8) and one of two starting symbols (e.g., indexes 12 and 8 or 9) is indicated. Therefore, 2*3*2=12 states are configured for PUCCH resources. The remaining four states are used to indicate one of four PUCCH resources based on other starting symbols (e.g., index 4 or 6). For example, a combination of one of the two interlace indexes and one of two CS indexes (e.g., 0 and 4) is indicated.

As another method, PUCCH resource sets based on combinations of Table 16 may be at least included in an RMSI signaling based PUCCH resource set table. When one of the combinations of Table 16 is configured through RMSI signaling, Method C or D of Proposal 4) and/or Method D or E of Proposal 5) may be applied to indicate a specific PUCCH resource in a PUCCH resource set based the combination.

TABLE 16

| PUCCH format | First symbol | Number of symbols | Cell-specific interlace offset | Set of initial CS indexes |
|---|---|---|---|---|
| 0 | 12 | 2 | 0 | {0, 3} |
| 0 | 12 | 2 | 2 | {0, 3} |
| 0 | 12 | 2 | 0 | {0, 4, 8} |
| 0 | 12 | 2 | 2 | {0, 4, 8} |

As another method, PUCCH resource sets based on combinations of Table 17 may be at least included in an RMSI signaling based PUCCH resource set table. When one of the combinations of Table 17 is configured through RMSI signaling, Method A or B of Proposal 4) and/or Method A or C of Proposal 5) may be applied to indicate a specific PUCCH resource in a PUCCH resource set based the combination.

TABLE 17

| PUCCH format | First symbol | Number of symbols | Cell-specific interlace offset | Set of initial CS indexes |
|---|---|---|---|---|
| 1 | 10 | 4 | 0 | {0, 6} |
| 1 | 10 | 4 | 2 | {0, 6} |
| 1 | 10 | 4 | 0 | {0, 3, 6, 9} |
| 1 | 10 | 4 | 2 | {0, 3, 6, 9} |

As another method, PUCCH resource sets based on combinations of Table 18 may be at least included in an RMSI signaling based PUCCH resource set table. When one of the combinations of Table 18 is configured through RMSI signaling, Method A or B of Proposal 4) and/or Method A or B of Proposal 5) may be applied to indicate a specific PUCCH resource in a PUCCH resource set based the combination.

TABLE 18

| PUCCH format | First symbol | Number of symbols | Cell-specific interlace offset | Set of initial CS indexes |
|---|---|---|---|---|
| 1 | 4 | 10 | 0 | {0, 6} |
| 1 | 4 | 10 | 2 | {0, 6} |
| 1 | 4 | 10 | 0 | {0, 3, 6, 9} |
| 1 | 4 | 10 | 2 | {0, 3, 6, 9} |

As another method, PUCCH resource sets based on combinations of Table 19 may be at least included in an RMSI signaling based PUCCH resource set table. When one of the combinations of Table 19 is configured through RMSI signaling, Method A or B of Proposal 4) and/or Method A or B of Proposal 5) may be applied to indicate a specific PUCCH resource in a PUCCH resource set based the combination.

TABLE 19

| PUCCH format | First symbol | Number of symbols | Cell-specific interlace offset | Set of initial CS indexes |
|---|---|---|---|---|
| 1 | 0 | 14 | 0 | {0, 6} |
| 1 | 0 | 14 | 2 | {0, 6} |

TABLE 19-continued

| PUCCH format | First symbol | Number of symbols | Cell-specific interlace offset | Set of initial CS indexes |
|---|---|---|---|---|
| 1 | 0 | 14 | 0 | {0, 3, 6, 9} |
| 1 | 0 | 14 | 2 | {0, 3, 6, 9} |

Next, according to Approach 3 described above, a 4-bit RMSI signaling based PUCCH resource set table to which cell-specific interlace offsets (or cell-specific interlace index offsets) are added may be defined as shown in Table 20. In NR-U, since a UL resource for transmission of PUCCH formats 0 and 1 is changed to one interlace consisting of multiple PRBs rather than one PRB, the 4-bit RMSI signaling based PUCCH resource set table may be configured by changing PRB offsets of the conventional system to interlace offsets. In Approach 3, since a PUCCH resource is indicated by 3-bit PRI+1-bit CCE, a total of 16 states may be configured for PUCCH resources in one PUCCH resource set.

TABLE 20

| Index | PUCCH format | First symbol | Number of symbols | Cell-specific interlace offset | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 2 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 4 | 10 | 0 | {0, 6} |
| 7 | 1 | 4 | 10 | 0 | {0, 3, 6, 9} |
| 8 | 1 | 4 | 10 | 1 | {0, 3, 6, 9} |
| 9 | 1 | 4 | 10 | 2 | {0, 3, 6, 9} |
| 10 | 1 | 4 | 10 | 3 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 1 | {0, 3, 6, 9} |
| 14 | 1 | 0 | 14 | 2 | {0, 3, 6, 9} |
| 15 | 1 | 0 | 14 | 3 | {0, 3, 6, 9} |

Based on Table 20, PUCCH resource sets may be configured according to Option 3 (where four interlace indexes are used) among the proposed options. In particular, an actual PUCCH interlace index to be used by the UE may be determined by the sum of a value indicated by a cell-specific interlace offset (or cell-specific interlace index offset) and a value indicated by an interlace index offset (or UE-specific interlace index offset) to be described in Proposal 6). For example, the UE-specific interlace index offset may be defined as 0 or 1. When the cell-specific interlace index offset is 0, if it is defined in Proposal 6) below that two interlace indexes (or two UE-specific interlace indexes) are used, the UE may use interlace indexes #0 and #1. For the use of interlace indexes #0 and #1, the UE-specific interlace index offset may be indicated as 0 or 1. When the cell-specific interlace index offset is 2, if it is defined in Proposal 6) that two interlace indexes (or two UE-specific interlace indexes) are used, the UE may use interlace indexes #2 and #3. For the use of interlace indexes #2 and #3, the UE-specific interlace index offset may be indicated as 0 or 1.

Proposal 6) Cases in which four interlace indexes are used as in Option 3 based on Table 20 will be described.

A. For (RMSI values) indexes 7, 8, 9, 10, 12, 13, 14, and 15 of Table 20, a combination of one of four CS indexes (i.e., 0, 3, 6, and 9) and one of four OCC indexes (e.g., 0, 1, 2, and 3) is indicated. The PUCCH interlace index is determined by a cell-specific interlace offset. For example, when the cell-specific interlace offset is X, the final PUCCH interlace actually allocated to the UE is also an interlace with index X. Therefore, 4*4=16 states are configured for PUCCH resources.

B. For (RMSI values) indexes 4 and 5 of Table 20, a combination of one of two interlace indexes (offset 0 or 1), one of four CS indexes (i.e., 0, 3, 6, and 9), and one of two OCC indexes (e.g., 0 and 1) is indicated. Therefore, 2*4*2=16 states are configured for PUCCH resources. The offset value of 0 or 1 for indicating the two interlace indexes may be indicated by a UE-specific interlace offset.

C. For (RMSI value) index 3, 6, and 11 of Table 20, a combination of one of the four interlace indexes, one of two CS indexes (i.e., 0 and 6), and one of two OCC indexes (e.g., 0 and 1) is indicated. Therefore, 4*2*2=16 states are configured for PUCCH resources.

D. For (RMSI value) index 0 of Table 20, a combination of one of the four interlace indexes, one of two CS indexes (i.e., 0 and 3), and one of two starting symbol indexes (e.g., 12 and 8 or 9) is indicated. Therefore, 4*2*2=16 states are configured for PUCCH resources.

E. For (RMIS value) indexes 1 and 2 of Table 20, a combination of one of two interlace indexes (offset 0 or 1), one of three CS indexes (i.e., 0, 4, and 8), and one of two starting symbol indexes (e.g., 12 and 8 or 9) is indicated. Therefore, 2*3*2=12 states are configured for PUCCH resources. The remaining four states are used to indicate one of four PUCCH resources based on other starting symbols (e.g., index 4 or 6). For example, a combination of one of the two interlace indexes (offset 0 or 1) and one of two CS indexes (e.g., #0 and #4) is indicated. Starting symbol index 4 or 6 is applied to the remaining four states. As another example, a combination of three CS indexes may be indicated by one interlace index (e.g., offset 0), and only a specific CS index (e.g., #0) may be used by the other interlace index (e.g., offset 1).

As another method, PUCCH resource sets based on combinations of Table 21 may be at least included in an RMSI signaling based PUCCH resource set table. When one of the combinations of Table 21 is configured through RMSI signaling, Method D or E of Proposal 6) may be applied to indicate a specific PUCCH resource in a PUCCH resource set based the combination.

TABLE 21

| PUCCH format | First symbol | Number of symbols | Cell-specific interlace offset | Set of initial CS indexes |
|---|---|---|---|---|
| 0 | 12 | 2 | 0 | {0, 3} |
| 0 | 12 | 2 | 0 | {0, 4, 8} |
| 0 | 12 | 2 | 2 | {0, 4, 8} |

As another method, PUCCH resource sets based on combinations of Table 22 may be at least included in an RMSI signaling based PUCCH resource set table. When one of the combinations of Table 22 is configured through RMSI signaling, Method B or C of Proposal 6) may be applied to indicate a specific PUCCH resource in a PUCCH resource set based the combination.

TABLE 22

| PUCCH format | First symbol | Number of symbols | Cell-specific interlace offset | Set of initial CS indexes |
|---|---|---|---|---|
| 1 | 10 | 4 | 0 | {0, 6} |
| 1 | 10 | 4 | 0 | {0, 3, 6, 9} |
| 1 | 10 | 4 | 2 | {0, 3, 6, 9} |

As another method, PUCCH resource sets based on combinations of Table 23 may be at least included in an RMSI signaling based PUCCH resource set table. When one of the combinations of Table 23 is configured through RMSI signaling, Method A or C of Proposal 6) may be applied to indicate a specific PUCCH resource in a PUCCH resource set based the combination.

TABLE 23

| PUCCH format | First symbol | Number of symbols | Cell-specific interlace offset | Set of initial CS indexes |
|---|---|---|---|---|
| 1 | 4 | 10 | 0 | {0, 6} |
| 1 | 4 | 10 | 0 | {0, 3, 6, 9} |
| 1 | 4 | 10 | 1 | {0, 3, 6, 9} |
| 1 | 4 | 10 | 2 | {0, 3, 6, 9} |
| 1 | 4 | 10 | 3 | {0, 3, 6, 9} |

As another method, PUCCH resource sets based on combinations of Table 24 may be at least included in an RMSI signaling based PUCCH resource set table. When one of the combinations of Table 24 is configured through RMSI signaling, Method A or C of Proposal 6) may be applied to indicate a specific PUCCH resource in a PUCCH resource set based the combination.

TABLE 24

| PUCCH format | First symbol | Number of symbols | Cell-specific interlace offset | Set of initial CS indexes |
|---|---|---|---|---|
| 1 | 0 | 14 | 0 | {0, 6} |
| 1 | 0 | 14 | 0 | {0, 3, 6, 9} |
| 1 | 0 | 14 | 1 | {0, 3, 6, 9} |
| 1 | 0 | 14 | 2 | {0, 3, 6, 9} |
| 1 | 0 | 14 | 3 | {0, 3, 6, 9} |

Additionally, the following structure may be applied in consideration of 3-sector cell deployment. That is, a 4-bit RMSI signaling based PUCCH resource set table to which cell-specific interlace offsets (or cell-specific interlace index offsets) are added may be additionally defined as shown in Table 25. In NR-U, since a UL resource for transmission of PUCCH formats 0 and 1 is changed to one interlace consisting of multiple PRBs rather than one PRB, the 4-bit RMSI signaling based PUCCH resource set table may be configured by changing PRB offsets of the conventional system to interlace offsets. In addition, since a PUCCH resource is indicated by 3-bit PRI+1-bit CCE, a total of 16 states may be configured for PUCCH resources in one PUCCH resource set.

TABLE 25

| Index | PUCCH format | First symbol | Number of symbols | Cell-specific interlace offset | Set of initial CS indexes |
|---|---|---|---|---|---|
| 0 | 0 | 12 | 2 | 0 | {0, 3} |
| 1 | 0 | 12 | 2 | 2 | {0, 3} |
| 2 | 0 | 12 | 2 | 0 | {0, 4, 8} |
| 3 | 0 | 12 | 2 | 2 | {0, 4, 8} |

TABLE 25-continued

| Index | PUCCH format | First symbol | Number of symbols | Cell-specific interlace offset | Set of initial CS indexes |
|---|---|---|---|---|---|
| 4 | 1 | 10 | 4 | 0 | {0, 6} |
| 5 | 1 | 10 | 4 | 0 | {0, 3, 6, 9} |
| 6 | 1 | 10 | 4 | 1 | {0, 3, 6, 9} |
| 7 | 1 | 10 | 4 | 2 | {0, 3, 6, 9} |
| 8 | 1 | 4 | 10 | 0 | {0, 6} |
| 9 | 1 | 4 | 10 | 0 | {0, 3, 6, 9} |
| 10 | 1 | 4 | 10 | 1 | {0, 3, 6, 9} |
| 11 | 1 | 4 | 10 | 2 | {0, 3, 6, 9} |
| 12 | 1 | 0 | 14 | 0 | {0, 6} |
| 13 | 1 | 0 | 14 | 0 | {0, 3, 6, 9} |
| 14 | 1 | 0 | 14 | 1 | {0, 3, 6, 9} |
| 15 | 1 | 0 | 14 | 2 | {0, 3, 6, 9} |

Based on Table 25, PUCCH resource sets may be configured according to Option 3 (where four interlace indexes are used) among the proposed options. In particular, an actual PUCCH interlace index to be used by the UE may be determined by the sum of a value indicated by a cell-specific interlace offset (or cell-specific interlace index offset) and a value indicated by an interlace index offset (or UE-specific interlace index offset) to be described in Proposal 7). For example, the UE-specific interlace index offset may be defined as 0 or 1. When the cell-specific interlace index offset is 0, if it is defined in Proposal 7) below that two interlace indexes (or two UE-specific interlace indexes) are used, the UE may use interlace indexes #0 and #1. For the use of interlace indexes #0 and #1, the UE-specific interlace index offset may be indicated as 0 or 1. When the cell-specific interlace index offset is 2, if it is defined in Proposal 7) that two interlace indexes (or two UE-specific interlace indexes) are used, the UE may use interlace indexes #2 and #3. For the use of interlace indexes #2 and #3, the UE-specific interlace index offset may be indicated as 0 or 1.

Proposal 7) Cases in which four interlace indexes are used as in Option 3 based on Table 25 will be described.

A. For (RMSI values) indexes 9, 10, 11, 13, 14, and 15 of Table 25, a combination of one of four CS indexes (i.e., 0, 3, 6, and 9) and one of four OCC indexes (e.g., 0, 1, 2, 3) is indicated. The PUCCH interlace index is determined by a cell-specific interlace offset. For example, when the cell-specific interlace offset is X, the final PUCCH interlace actually allocated to the UE is also an interlace with index X. Therefore, 4*4=16 states are configured for PUCCH resources.

B. For (RMSI values) indexes 5, 6, 7 of Table 25, a combination of one of four CS indexes (i.e., 0, 3, 6, and 9), one of two OCC indexes (i.e., 0 and 1), and one of two starting symbol indexes (e.g., 10 and 4 or 5) is indicated. The PUCCH interlace index is determined by a cell-specific interlace offset. For example, when the cell-specific interlace offset is X, the final PUCCH interlace actually allocated to the UE is also an interlace with index X. Therefore, 4*2*2=16 states are configured for PUCCH resources.

C. For (RMSI values) indexes 4, 8, and 12 of Table 25, a combination of one of the four interlace indexes, one of two CS indexes (i.e., 0 and 6), and one of two OCC indexes (e.g., 0 and 1) is indicated. Therefore, 4*2*2=16 states are configured for PUCCH resources.

D. For (RMSI value) indexes 0 and 1 of Table 25, a combination of one of two interlace indexes (offset 0 or 1), one of two CS indexes (i.e., 0 and 3), and one of four starting symbol indexes (e.g., 12, 8 or 9, 4 or 6, and 0, or 3) is indicated. Therefore, 2*2*4-16 states are configured for PUCCH resources. The offset value of 0 or 1 for indicating the two interlace indexes may be indicated by a UE-specific interlace offset.

E. For (RMSI value) indexes 2 and 3 of Table 25, a combination of one of two interlace indexes (offset 0 or 1), one of three CS indexes (i.e., 0, 4, and 8), and one of two starting symbol indexes (e.g., 12 and 8 or 9) is indicated. Therefore, 2*3*2=12 states are configured for PUCCH resources. The remaining four states are used to indicate one of four PUCCH resources based on other starting symbols (e.g., index 4 or 6). For example, a combination of one of the two interlace indexes (offset 0 or 1) and one of two CS indexes (e.g., #0, #4) is indicated. Starting symbol index 4 or 6 may be applied to the remaining four states. As another example, a combination of three CS indexes may be indicated by one interlace index (e.g., offset 0), and only a specific CS index (e.g., #0) may be used by the other interlace index (e.g., offset 1).

As another method, PUCCH resource sets based on combinations of Table 26 may be at least included in an RMSI signaling based PUCCH resource set table. When one of the combinations of Table 26 is configured through RMSI signaling, Method D or E of Proposal 7) may be applied to indicate a specific PUCCH resource in a PUCCH resource set based the combination.

TABLE 26

| PUCCH format | First symbol | Number of symbols | Cell-specific interlace offset | Set of initial CS indexes |
| --- | --- | --- | --- | --- |
| 0 | 12 | 2 | 0 | {0, 3} |
| 0 | 12 | 2 | 2 | {0, 3} |
| 0 | 12 | 2 | 0 | {0, 4, 8} |
| 0 | 12 | 2 | 2 | {0, 4, 8} |

As another method, PUCCH resource sets based on combinations of Table 27 may be at least included in an RMSI signaling based PUCCH resource set table. When one of the combinations of Table 27 is configured through RMSI signaling, Method B or C of Proposal 7) may be applied to indicate a specific PUCCH resource in a PUCCH resource set based the combination.

TABLE 27

| PUCCH format | First symbol | Number of symbols | Cell-specific interlace offset | Set of initial CS indexes |
| --- | --- | --- | --- | --- |
| 1 | 10 | 4 | 0 | {0, 6} |
| 1 | 10 | 4 | 0 | {0, 3, 6, 9} |
| 1 | 10 | 4 | 1 | {0, 3, 6, 9} |
| 1 | 10 | 4 | 2 | {0, 3, 6, 9} |

As another method, PUCCH resource sets based on combinations of Table 28 may be at least included in an RMSI signaling based PUCCH resource set table. When one of the combinations of Table 28 is configured through RMSI signaling, Method A or C of Proposal 7) may be applied to indicate a specific PUCCH resource in a PUCCH resource set based the combination.

TABLE 28

| PUCCH format | First symbol | Number of symbols | Cell-specific interlace offset | Set of initial CS indexes |
| --- | --- | --- | --- | --- |
| 1 | 4 | 10 | 0 | {0, 6} |
| 1 | 4 | 10 | 0 | {0, 3, 6, 9} |
| 1 | 4 | 10 | 1 | {0, 3, 6, 9} |
| 1 | 4 | 10 | 2 | {0, 3, 6, 9} |

As another method, PUCCH resource sets based on combinations of Table 29 may be at least included in an RMSI signaling based PUCCH resource set table. When one of the combinations of Table 29 is configured through RMSI signaling, Method A or C of Proposal 7) may be applied to indicate a specific PUCCH resource in a PUCCH resource set based the combination.

TABLE 29

| PUCCH format | First symbol | Number of symbols | Cell-specific interlace offset | Set of initial CS indexes |
| --- | --- | --- | --- | --- |
| 1 | 0 | 14 | 0 | {0, 6} |
| 1 | 0 | 14 | 0 | {0, 3, 6, 9} |
| 1 | 0 | 14 | 1 | {0, 3, 6, 9} |
| 1 | 0 | 14 | 2 | {0, 3, 6, 9} |

Additionally, the following structure may be applied in consideration of 3-sector cell deployment. That is, a 4-bit RMSI signaling based PUCCH resource set table to which cell-specific interlace offsets (or cell-specific interlace index offsets) are added may be additionally defined as shown in Table 30. In NR-U, since a UL resource for transmission of PUCCH formats 0 and 1 is changed to one interlace consisting of multiple PRBs rather than one PRB, the 4-bit RMSI signaling based PUCCH resource set table may be configured by changing PRB offsets of the conventional system to interlace offsets. In addition, since a PUCCH resource is indicated by 3-bit PRI+1-bit CCE, a total of 16 states may be configured for PUCCH resources in one PUCCH resource set.

TABLE 30

| Index | PUCCH format | First symbol | Number of symbols | Cell-specific interlace offset | Set of initial CS indexes |
| --- | --- | --- | --- | --- | --- |
| 0 | 0 | 12 | 2 | 0 | {0, 3} |
| 1 | 0 | 12 | 2 | 0 | {0, 4, 8} |
| 2 | 0 | 12 | 2 | 1 | {0, 4, 8} |
| 3 | 1 | 10 | 4 | 2 | {0, 4, 8} |
| 4 | 1 | 10 | 4 | 0 | {0, 6} |
| 5 | 1 | 10 | 4 | 0 | {0, 3, 6, 9} |
| 6 | 1 | 4 | 10 | 1 | {0, 3, 6, 9} |
| 7 | 1 | 4 | 10 | 2 | {0, 3, 6, 9} |
| 8 | 1 | 4 | 10 | 0 | {0, 6} |
| 9 | 1 | 4 | 10 | 0 | {0, 3, 6, 9} |
| 10 | 1 | 4 | 10 | 1 | {0, 3, 6, 9} |
| 11 | 1 | 0 | 14 | 2 | {0, 3, 6, 9} |
| 12 | 1 | 0 | 14 | 0 | {0, 6} |
| 13 | 1 | 0 | 14 | 0 | {0, 3, 6, 9} |
| 14 | 1 | 0 | 14 | 1 | {0, 3, 6, 9} |
| 15 | 1 | 0 | 14 | 2 | {0, 3, 6, 9} |

Based on Table 30, PUCCH resource sets may be configured according to Option 3 (where four interlace indexes are used) among the proposed options. In particular, an actual PUCCH interlace index to be used by the UE may be determined by the sum of a value indicated by a cell-specific interlace offset (or cell-specific interlace index offset) and a value indicated by an interlace index offset (or UE-specific interlace index offset) to be described in Proposal 8). For example, the UE-specific interlace index offset may be defined as 0 or 1. When the cell-specific interlace index offset is 0, if it is defined in Proposal 8) below that two interlace indexes (or two UE-specific interlace indexes) are used, the UE may use interlace indexes #0 and #1. For the use of interlace indexes #0 and #1, the UE-specific interlace index offset may be indicated as 0 or 1. When the cell-specific interlace index offset is 2, if it is defined in Proposal 8) that two interlace indexes (or two UE-specific interlace indexes) are used, the UE may use interlace indexes #2 and #3. For the use of interlace indexes #2 and #3, the UE-specific interlace index offset may be indicated as 0 or 1.

Proposal 8) Cases in which four interlace indexes are used as in Option 3 based on Table 30 will be described.

A. For (RMSI value) indexes 9, 10, 11, 13, 14, and 15 of Table 30, a combination of one of four CS indexes (i.e., 0, 3, 6, and 9) and one of four OCC indexes (e.g., 0, 1, 2, and 3) is indicated. The PUCCH interlace index is determined by a cell-specific interlace offset. For example, when the cell-specific interlace offset is X, the final PUCCH interlace actually allocated to the UE is also an interlace with index X. Therefore, 4*4=16 states are configured for PUCCH resources.

B. For (RMSI value) index 5, 6, and 7 of Table 30, a combination of one of four CS indexes (i.e., 0, 3, 6, and 9), one of two OCC indexes (i.e., 0 and 1), and one of two symbol indexes (e.g., 10 and 4 or 5) is indicated. The PUCCH interlace index is determined by a cell-specific interlace offset. For example, when the cell-specific interlace offset is X, the final PUCCH interlace actually allocated to the UE is an interlace with index X. Therefore, 4*2*2=16 states are configured for PUCCH resources.

C. For (RMSI value) indexes 4, 8, and 12 of Table 30, a combination of one of the four interlace indexes, one of two CS indexes (i.e., 0 and 6), and one of two OCC indexes (e.g., 0 and 1) is indicated. Therefore, 4*2*2=16 states are configured for PUCCH resources.

D. For (RMSI value) index 0 of Table 30, a combination of one of the four interlace indexes, one of two CS indexes (i.e., 0 and 3), and one of two starting symbol indexes (e.g., 12 and 8 or 9) is indicated. Therefore, 4*2*2=16 states are configured for PUCCH resources.

E. For (RMSI value) indexes 1, 2, and 3 of Table 30, a combination of one of three CS indexes (i.e., 0, 4, and 8) and one of five starting symbol indexes (e.g., 12, 9, 6, 3, and 0) is indicated. The PUCCH interlace index is determined by a cell-specific interlace offset. For example, if the cell-specific interlace offset is X, the final PUCCH interlace actually allocated to the UE is also an interlace with index X. Therefore, 3*5=15 states are configured for PUCCH resources. The remaining one state is set as a reserved state.

As another method, PUCCH resource sets based on combinations of Table 31 may be at least included in an RMSI signaling based PUCCH resource set table. When one of the combinations of Table 31 is configured through RMSI signaling, Method D or E of Proposal 8) may be applied to indicate a specific PUCCH resource in a PUCCH resource set based the combination.

TABLE 31

| PUCCH format | First symbol | Number of symbols | Cell-specific interlace offset | Set of initial CS indexes |
|---|---|---|---|---|
| 0 | 12 | 2 | 0 | {0, 3} |
| 0 | 12 | 2 | 0 | {0, 4, 8} |

TABLE 31-continued

| PUCCH format | First symbol | Number of symbols | Cell-specific interlace offset | Set of initial CS indexes |
|---|---|---|---|---|
| 0 | 12 | 2 | 1 | {0, 4, 8} |
| 0 | 12 | 2 | 2 | {0, 4, 8} |

As another method, PUCCH resource sets based on combinations of Table 32 may be at least included in an RMSI signaling based PUCCH resource set table. When one of the combinations of Table 32 is configured through RMSI signaling, Method B or C of Proposal 8) may be applied to indicate a specific PUCCH resource in a PUCCH resource set based the combination.

TABLE 32

| PUCCH format | First symbol | Number of symbols | Cell-specific interlace offset | Set of initial CS indexes |
|---|---|---|---|---|
| 1 | 10 | 4 | 0 | {0, 6} |
| 1 | 10 | 4 | 0 | {0, 3, 6, 9} |
| 1 | 10 | 4 | 1 | {0, 3, 6, 9} |
| 1 | 10 | 4 | 2 | {0, 3, 6, 9} |

As another method, PUCCH resource sets based on combinations of Table 33 may be at least included in an RMSI signaling based PUCCH resource set table. When one of the combinations of Table 33 is configured through RMSI signaling, Method A or C of Proposal 8) may be applied to indicate a specific PUCCH resource in a PUCCH resource set based the combination.

TABLE 33

| PUCCH format | First symbol | Number of symbols | Cell-specific interlace offset | Set of initial CS indexes |
|---|---|---|---|---|
| 1 | 4 | 10 | 0 | {0, 6} |
| 1 | 4 | 10 | 0 | {0, 3, 6, 9} |
| 1 | 4 | 10 | 1 | {0, 3, 6, 9} |
| 1 | 4 | 10 | 2 | {0, 3, 6, 9} |

As another method, PUCCH resource sets based on combinations of Table 34 may be at least included in an RMSI signaling based PUCCH resource set table. When one of the combinations of Table 34 is configured through RMSI signaling, Method A or C of Proposal 8) may be applied to indicate a specific PUCCH resource in a PUCCH resource set based the combination.

TABLE 34

| PUCCH format | First symbol | Number of symbols | Cell-specific interlace offset | Set of initial CS indexes |
|---|---|---|---|---|
| 1 | 0 | 14 | 0 | {0, 6} |
| 1 | 0 | 14 | 0 | {0, 3, 6, 9} |
| 1 | 0 | 14 | 1 | {0, 3, 6, 9} |
| 1 | 0 | 14 | 2 | {0, 3, 6, 9} |

3.2. Embodiment 2

Embodiment 1 relates to methods of introducing a new interlace structure capable of satisfying the OCB requirements under specific circumstances.

Figure 14:
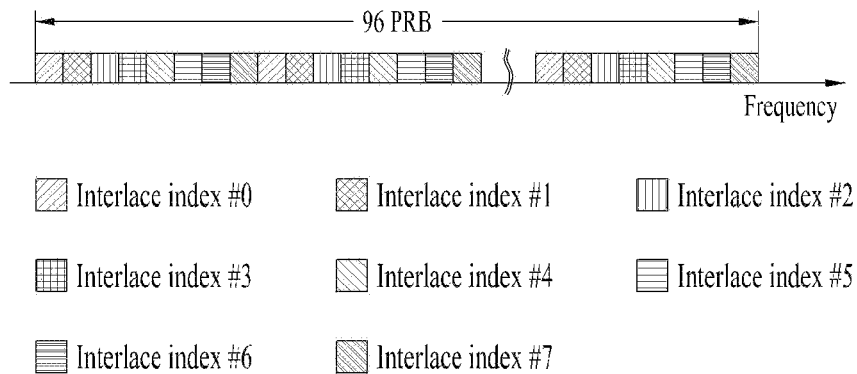

Specifically, Embodiment 2 relates to methods of introducing a new interlace structure suitable for an initial active UL BWP. For example, if the SCS of CORESET #0 is 30 kHz, the initial active UL BWP is set to 48 PRBs. Each interlace includes 12 PRBs. The interval between PRBs is determined as four PRBs (with respect to the PRB starting point). In this case, as shown in FIG. 14, each of the four interlaces (interlace indexes #0 to #3) consists of 12 PRBs. The frequency band occupied by each interlace is 45 (PRBs)*30 (SCS)*12 (subcarriers)=16200 kHz, thereby satisfying the OCB requirements.

Figure 15:
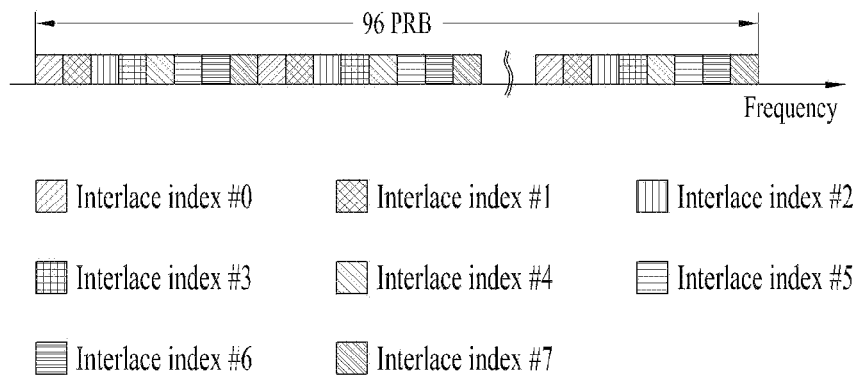

As another example, if the SCS of CORESET #0 is 15 kHz, the initial active UL BWP is set to 96 PRBs. Each interlace includes 12 PRBs. The interval between PRBs is determined as 8 PRBs (with respect to the PRB starting point). In this case, as shown in FIG. 15, each of the 8 interlaces (interlace indexes #0 to #7) consists of 12 PRBs. The frequency band occupied by each interlace is 89 (PRBs)*15 (SCS)*12 (subcarriers)=16020 kHz, thereby satisfying the OCB requirements.

In the above proposed methods, when the UE operates in the initial active UL BWP, the UE may be configured to use the proposed interlace structure where each interlace includes 12 RBs with an interval of four PRBs for the 30 kHz SCS or an interval of 8 PRBs for the 15 kHz SCS. The initial active UL BWP may include 48 PRBs for the 30 kHz SCS or 96 PRBs for the 15 kHz SCS. For example, the UE may be performing random access in the RRC-idle mode and/or RRC-connected mode. Additionally/alternatively, the UE may have established no RRC connection. Additionally/alternatively, the UE may have established no separate UE-specific UL BWP configuration. The interlace structure where each interlace consists of 12 RBs with an interval of four PRBs for the 30 kHz SCS or an interval of 8 PRBs for the 15 kHz SCS may be referred to as interlace type #1. For example, the UE may use the type #1 interlace structure for Msg3 PUSCH transmission and/or HARQ-ACK feedback transmission for Msg4 reception.

When the UE operates in another active UL BWP, the UE may be configured to use an interlace structure where each interlace includes 10 (or 11) RBs with an interval of five PRBs for the 30 kHz SCS or an interval of 10 PRBs for the 15 kHz SCS. The other active UL BWP may include 51 PRBs for the 30 kHz SCS or 106 PRBs for the 15 kHz SCS. For example, the UE may be performing random access in the RRC-idle mode and/or RRC-connected mode. Additionally/alternatively, the UE may have established no RRC connection.

Additionally/alternatively, the UE may have established no separate UE-specific UL BWP configuration. The interlace structure where each interlace consists of 10 (or 11) RBs with an interval of five PRBs for the 30 kHz SCS or an interval of 10 PRBs for the 15 kHz SCS may be referred to as interlace type #2.

Additionally, the Msg3 transmission process may be performed not only by a UE performing initial access but also by a UE in the connected mode. Accordingly, there may be a situation where the UE needs to select one of the proposed interlace consisting of 12 RBs and the interlace consisting of 10 RBs. The situation in which the UE performs the above selection may be at least a contention free random access (CFRA) situation. The BS may indicate which one of interlace type #1 where each interlace consists of 12 RBs and interlace type #2 where each interlace consists of 10 RBs the UE needs to use through a UL grant indicating PUSCH (e.g., Msg3) transmission.

Embodiments 1 and 2 proposed above may be applied to the following three cases.

a. Transmission in initial active UL BWP corresponding to CORESET (#0) configured by PBCH/SIB b. Transmission in initial active UL BWP corresponding to CORESET (#0) configured by RRC signaling other than PBCH/SIB c. Transmission in any active UL BWP established by RRC signaling

3.3. Embodiment 3

Embodiment 3 proposes new interlace structures available in other situations.

NR U-band operation in a channel bandwidth (BW) of 10 MHz is considered for the future. Accordingly, it is necessary to consider interlace structures available in the 10 MHz channel BW. According to Table 7, when the SCS is 30 kHz, the 10 MHz channel BW includes 24 PRBs. When the SCS is 15 kHz, the 10 MHz channel BW includes 52 PRBs. Hereinafter, the new interlace structures available in such a situation will be described.

(1) For 30 kHz SCS,

A. A structure in which each interlace consists of 12 PRBs and the interval between PRBs is two PRBs (with respect to the starting point) is proposed. The total number of interlace indexes is 2. The frequency band occupied by each interlace is 23 (PRBs)*30 (SCS)*12 (subcarriers)=8280 kHz, which exceeds 80% of 10 MHz, thereby satisfying the OCB requirements.

B. A structure in which each interlace consists of 8 PRBs and the interval between PRBs is three PRBs (with respect to the starting point) is proposed. The total number of interlace indexes is 3. The frequency band occupied by each interlace is 22 (PRBs)*30 (SCS)*12 (subcarriers)=7920 kHz.

(2) For 15 kHz SCS,

A. A structure in which each interlace consists of 10 (or 11) PRBs and the interval between PRBs is five PRBs (with respect to the starting point) is proposed. The total number of interlace indexes is 5. The frequency band occupied by each interlace is 46 (PRBs)*15 (SCS)*12 (subcarriers)=8280 kHz, which exceeds 80% of 10 MHz, thereby satisfying the OCB requirements.

When the SCS is 60 kHz, a BW of 20 MHz consists of 24 PRBs. Thus, proposed method (1) of Embodiment 3 may be equally applied.

4. Embodiment 4 (LBT Sub-Band Indication for Bandwidth Part Switching)

A plurality of BWPs may be configured in one serving cell configured for a UE. A different number of LBT sub-bands may be configured and/or defined in each BWP. For example, at least one to a maximum of five LBT sub-bands may be configured and/or defined in each BWP. In addition, to indicate an LBT sub-band to be allocated for a UL transmission of the UE, a BS may use a bitmap or an RIV. The UL transmission may include one or more of UL physical channels and/or signals described herein, such as a PUSCH and/or PUCCH transmission. The bitmap indicates whether each LBT sub-band is allocated to the UE by on/off of 1 bit. The RIV indicates a starting LBT sub-band and the number of consecutive LBT sub-bands in frequency from the starting LBT sub-band.

The UE should be allocated at least one LBT sub-band. When a bitmap is used and all information bits of the bitmap are indicated as 0, the UE may determine the indication as invalid information. Even when there is only one LBT sub-band in a specific BWP, the UE should be allocated at least one LBT sub-band. Therefore, the size of information bits for allocating an LBT sub-band may be zero. When there is only one LBT sub-band in a specific BWP, the UE should be allocated one LBT sub-band, and thus an indication through 0/1 is not required.

Characteristically, information bits may be configured as follows to allocate an LBT sub-band by a bitmap or an RIV. Hereinafter, the total number of information bits is K. Since an LBT sub-band includes a set of RBs, it may also be referred to as an RB set.

4-1-A) Information bits for allocating an LBT sub-band may be transmitted by newly defining a DCI field including K bits, independently of an existing DCI field. The DCI field including K bits indicates an LBT sub-band, and a frequency domain resource allocation (FDRA) field indicates an interlace allocation.

4-1-B) An LBT sub-band may be allocated by adding K most significant bits (MSBs) to the FDRA field predefined in the conventional system. Therefore, the single FDRA field simultaneously indicates an LBT sub-band and an interlace allocation.

4-1-C) An LBT sub-band may be allocated by adding K least significant bits (LSBs) to the FDRA field predefined in the conventional system. The FDRA field includes K bits providing information about an RB set and MSBs providing information about an interlace allocation. Therefore, the single FDRA field simultaneously indicates an LBT sub-band and an interlace allocation.

A method of interpreting an information field according to BWP switching is defined in the conventional NR system. A UL (or DL) BWP to which the UE is to switch from a current active UL (or DL) BWP is indicated to the UE by non fall-back DCI. The non-fallback DCI may include, for example, DCI format 0_1 for a UL grant and DCI format 1_1 for a DL grant.

4-2-1) When the number of PRBs (or the size of an RA field size corresponding to the number of PRBs) of the UL (or DL) BWP to be newly switched to is less than the number of PRBs of the current active UL (or DL) BWP (or the size of an RA field corresponding to the number of PRBs), the UE interprets only as many LSBs as the number of information bits of DCI indicated in the active BWP, corresponding to the number of PRBs of the UL (or DL) BWP to be newly switched to.

4-2-2) When the number of PRBs (or the size of the RA field size corresponding to the number of PRBs) of the UL (or DL) BWP to be newly switched to is greater than the number of PRBs of the current active UL (or DL) BWP (or the size of the RA field corresponding to the number of PRBs), the UE pads the MSBs with zeroes so that the information field of DCI indicated in the active BWP matches the number of bits corresponding to the number of PRBs of the UL (or DL) BWP to be newly switched to, and then interprets the information field.

The operations of the conventional system described in 4-2-1 and 4-2-2 may be applied for a shared spectrum. As the number of LBT sub-bands of each UL (or DL) BWP changes, the size of information bits for allocating LBT sub-bands also changes. Therefore, the UE may apply the methods described in 4-2-1 and 4-2-2 to interpret the information bits. However, the methods described in 4-2-1 and 4-2-2 may not be used as they are, and an additional UE operation needs to be defined in relation to information bits for allocating an LBT sub-band. When LBT sub-bands are allocated by a bitmap or an RIV, an additional UE operation required in a specific case is proposed through the following examples.

4-3) It is assumed that the number of LBT sub-bands in a current active BWP is N (e.g., 0<N<6), and the number of LBT sub-bands of a new BWP to be switched to is M (e.g., 0<M<6).

4-3-1) When N>M and M>1, the following operations may be performed.

4-3-1-i) When the method of 4-1-A is applied, since M is smaller than N, the UE may interpret only the first L bits (i.e., L MSBs) or the last L bits (i.e., L LSBs) corresponding to the number of bits matching the number of LBT sub-bands in a new UL BWP to be switched to among the bits of an information field including an LBT sub-band indication field in DCI indicated in the active BWP, as LBT sub-band allocation information for the new BWP to be switched to. The number of bits of the information field in the DCI indicated to the UE in the active BWP may be K. When a bitmap is used, K=M. When the bitmap is used, L=M.

Even when an LBT sub-band is allocated by an RIV, N>M, and M>=1, the method of 4-3-1-i may be used. However, when the number of LBT sub-bands in the new BWP to be switched to is 1, L may be set to 0.

4-3-1-ii) When the method of 4-1-B is applied, since M is smaller than N, the UE may interpret only the first L bits (i.e., L MSBs) or the last L bits (i.e., L LSBs) corresponding to the number of bits matching the number of LBT sub-bands in a new BWP to be switched to among K MSBs of the FDRA field of DCI indicated in the active BWP, as LBT sub-band allocation information for the new BWP to be switched to. As described in 4-1-B, the K MSBs of the FDRA field correspond to information bits indicating an LBT sub-band.

Even when an LBT sub-band is allocated by an RIV, N>M, and M>=1, the method of 4-3-1-ii may be used. However, when the number of LBT sub-bands in the new BWP to be switched to is 1, L may be set to 0.

4-3-1-iii) When the method of 4-1-C is applied, since M is smaller than N, the UE may interpret only the first L bits (i.e., L MSBs) or the last L bits (i.e., L LSBs) corresponding to the number of bits matching the number of LBT sub-bands in a new BWP to be switched to among K LSBs of the FDRA field of DCI indicated in the active BWP, as LBT sub-band allocation information for the new BWP to be switched to. As described in 4-1-C, the K LSBs of the FDRA field correspond to information bits indicating an LBT sub-band (or RB-set).

Even when an LBT sub-band is allocated by an RIV, N>M, and M>=1, the method of 4-3-1-iii may be used. However, when the number of LBT sub-bands in the new BWP to be switched to is 1, L may be set to 0.

4-3-2) When N>M and M=1, since the number of LBT sub-bands of a new BWP to be switched to is 1, the UE may interpret that the UE is allocated the new BWP to be switched to, regardless of each information field including an LBT sub-band indication field and LBT sub-band allocation information signaled by the information field in DCI indicated to the UE in the active BWP. Alternatively, the UE may interpret that the UE is allocated the new BWP to be switched to, ignoring each information field including the LBT sub-band indication field and the LBT sub-band allocation information signaled by the information field in the DCI indicated to the UE in the active BWP.

4-3-3) When N<M and N>1, the following operations may be performed.

4-3-3-i) When the method of 4-1-A is applied, since M is larger than N, the UE may pad L bits of zeros at the beginning or end of an information field so that each information field of DCI indicated in an active BWP has bits matching the number of LBT sub-bands in a new BWP to be switched to, and then interpret the information field. For example, the information field may be an LBT sub-band indication field. The number of bits of the information field in the DCI indicated to the UE in the active BWP may be K. When a bitmap is used, K=M. When the bitmap is used, L=M.

In the case of zero padding at the beginning of the LBT sub-band indication field, the UE may subtract M-N from an LBT sub-band index obtained from indicated bitmap information and reinterpret the LBT sub-band index, so that LBT sub-bands may be allocated to the UE, starting from the lowest LBT sub-band index. For example, when N=2 and M=5, the UE may interpret the allocated LBT sub-band index as "000ii" (i is 0 or 1). When both i's are 1, LBT sub-band indexes #3 and #4 are indicated. However, the UE may reinterpret the LBT sub-band indexes as LBT sub-band indexes #0 and #1 by subtracting 3 (=5-2) from LBT sub-band indexes #3 and #4.

Even when an LBT sub-band is allocated by an RIV, N<M, and N>=1, the method of 4-3-3-i may be used. However, when the number of LBT sub-bands of a new BWP to be switched to is 1, K may be set to 0.

4-3-3-ii) When the method of 4-1-B is applied, since M is larger than N, the UE may interpret the FDRA field of DCI indicated in an active BWP after zero-padding at the beginning or end of K MSBs of the FDRA field, so that the K MSBs of the FDRA field match the number of LBT sub-bands in a new BWP to be switched to. As described in 4-1-B, the K MSBs of the FDRA field correspond to information bits indicating an LBT sub-band.

In the case of zero padding at the beginning of the K MSBs of the FDRA field, the UE may subtract M-N from an LBT sub-band index obtained from indicated bitmap information and reinterpret the LBT sub-band index, so that LBT sub-bands may be allocated to the UE, starting from the lowest LBT sub-band index.

Even when an LBT sub-band is allocated by an RIV, N<M, and N>=1, the method of 4-3-3-ii may be used. However, when the number of LBT sub-bands of a new BWP to be switched to is 1, K may be set to 0.

4-3-3-iii) When the method of 4-1-C is applied, since M is larger than N, the UE may interpret the FDRA field of DCI indicated in an active BWP after zero-padding at the beginning or end of K LSBs of the FDRA field, so that the K LSBs of the FDRA field match the number of LBT sub-bands in a new BWP to be switched to. As described in 4-1-C, the K LSBs of the FDRA field correspond to information bits indicating an LBT sub-band (or RB-set).

In the case of zero padding at the beginning of the K LSBs of the FDRA field, the UE may subtract M-N from an LBT sub-band index obtained from indicated bitmap information and reinterpret the LBT sub-band index, so that LBT sub-bands may be allocated to the UE, starting from the lowest LBT sub-band index.

Even when an LBT sub-band is allocated by an RIV, N<M, and N>=1, the method of 4-3-3-iii may be used. However, when the number of LBT sub-bands of a new BWP to be switched to is 1, K may be set to 0.

4-3-4) N<M and N=1

4-3-4-i) When the method of 4-1-A is applied, since M is larger than N, the UE may pad L bits of zeros at the beginning or end of an information field so that each information field of DCI indicated in an active BWP has bits matching the number of LBT sub-bands in a new BWP to be switched to, and then interpret the information field. For example, the information field may be an LBT sub-band indication field. Because N=1, K=0.

4-3-4-ii) When the method of 4-1-B is applied, since M is larger than N, the UE may interpret the FDRA field of DCI indicated in an active BWP after zero-padding at the beginning or end of K MSBs of the FDRA field, so that the K MSBs of the FDRA field match the number of LBT sub-bands in a new BWP to be switched to. For example, the information field may be an LBT sub-band indication field. Because N=1, K=0.

4-3-3-iii) When the method of 4-1-C is applied, since M is larger than N, the UE may interpret the FDRA field of DCI indicated in an active BWP after zero-padding at the beginning or end of K LSBs of the FDRA field, so that the K LSBs of the FDRA field match the number of LBT sub-bands in a new BWP to be switched to.

4-3-4-iv) In 4-3-4i to 4-3-4iii, since N=1, the UE interprets an information field that allocates an LBT sub-band of a new BWP to be switched to as all zeroes, after zero padding.

4-3-4-v) In the case where an LBT sub-band is allocated by a bitmap, when the BS indicates all bits of the information field as 0s, the indication may be processed as invalid. However, in 4-3-4, even when the BS does not indicate all bits in the field as 0s, the UE should interpret all bits as 0s, and thus it may be difficult to process the indication as invalid. Therefore, when all bits in the information field for allocating an LBT sub-band are interpreted as 0s during BWP switching, the following operations may be defined.

4-3-4-v-1) A field in which all bits are 0s is interpreted as an LBT sub-band having the lowest (or highest) index (or frequency) configured in a new BWP to be switched to. Therefore, the UE interprets that the field in which all bits are 0s indicates and/or allocates the LBT sub-band having the lowest (or highest) index (or frequency) configured in the new BWP to be switched to. For example, LBT sub-band index #0 of the new BWP to be switched to may be configured for the UE.

4-3-4-v-2) A field in which all bits are 0s may be interpreted as an LBT sub-band index indicated by higher-layer signaling (e.g., an SIB or dedicated RRC signaling) from the BS.

4-3-4-v-3) A field in which all bits are 0s may be interpreted as all LBT sub-bands configured in a new BWP to be switched to. Therefore, the UE interprets the field in which all bits are 0s as indicating and/or allocating an entire LBT sub-band set configured in the new BWP to be switched to.

Additionally, as a BWP allocated to the UE changes, a numerology may also change. When an SCS is changed, the size of bits for scheduling an interlace index (i.e., X bits of an FDRA field in a UL grant in 38.212, wherein X=5 for the 30-kHz SCS and X=6 for the 15-kHz SCS) also changes. Characteristically, the RB set is allocated by using Y bits of the FDRA field. An RB set refers to an LBT sub-band in this specification. An additional UE operation is proposed through the following examples.

4-4-1) Case 1: When the SCS of an active BWP is 15 kHz and the SCS of a new BWP to be switched to is 30 kHz (i.e., when an X bit field size needs to be reduced from 6 to 5), the following operations may be performed.

4-4-1-A) When the method of 4-1-A is applied (when an X-bit field and a Y-bit field are configured independently), the UE may interpret only the first 5 bits (i.e., 5 MSBs) or the last 5 bits (i.e., 5 LSBs) as allocation information for the interlace index of a new BWP to be switched to, according to 5 bits being a field indicating an interlace index according to the numerology of a new BWP to be switched to, among information fields including the interlace index indication field in DCI indicated in an active BWP. Each information field including the interlace index indication field may include a 6-bit field indicating an interlace index.

4-4-1-B) When the method of 4-1-B is applied, that is, when the FDRA field includes a total of X+Y bits where Y is the number of MSBs and X is the number of LSBs, the UE may interpret only the first 5 bits (i.e., 5 MSBs) or the last 5 bits (i.e., 5 LSBs) among 6 LSBs of the FDRA field in DCI indicated in an active BWP, as allocation information for an interlace index in a new BWP to be switched to, according to 5 bits being a field indicating an interlace index according to the numerology of a new BWP to be switched to.

4-4-1-C) When the method of 4-1-C is applied, that is, when the FDRA field includes a total of X+Y bits where X is the number of MSBs and Y is the number of LSBs, the UE may interpret only the first 5 bits (i.e., 5 MSBs) or the last 5 bits (i.e., 5 LSBs) among 6 MSBs of the FDRA field in DCI indicated in an active BWP, as allocation information for an interlace index in a new BWP to be switched to, according to 5 bits being a field indicating an interlace index according to the numerology of the new BWP to be switched to.

4-4-2) Case 2: When the SCS of an active BWP is 30 kHz and the SCS of a new BWP to be switched to is 15 kHz (i.e., when an X bit field size needs to be increased from 5 to 6), the following operations may be performed.

4-4-2-A) When the method of 4-1-A is applied (when an X-bit field and a Y-bit field are configured independently), the UE may pad zeroes at the beginning or end of each of information fields including an index indication field in DCI indicated in an active BWP, so that the information field may match 6 bits of the interlace index indication field according to the numerology of a new BWP to be switched to, and then interpret the information field.

4-4-2-B) When the method of 4-1-B is applied (when the FDRA field includes a total of X+Y bits where Y is the number of MSBs and X is the number of LSBs), the UE may pad zeroes at the beginning or end of 5 LSBs of the FDRA field in DCI indicated in an active BWP, so that the 5 LSBs of the FDRA field may match 6 bits being an interlace index indication field according to the numerology of a new BWP to be switched to, and then interpret the FDRA field.

4-4-2-C) When the method of 4-1-C is applied (when the FDRA field includes a total of X+Y bits with X is the number of MSBs and Y is the number of LSBs), the UE may pad zeroes at the beginning or end of 5 MSBs of the FDRA field in DCI indicated in an active BW, so that the 5 MSBs of the FDRA field may match 6 bits being an interlace index indication field according to the numerology of a new BWP to be switched to, and then interpret the FDRA field.

Implementation Examples

Figure 16:
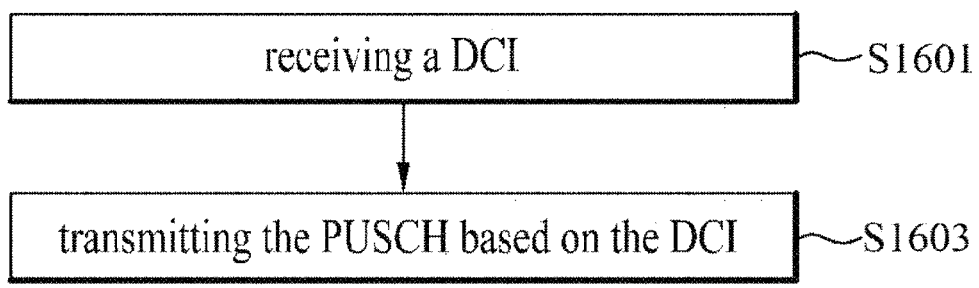

FIG. 16 is a flowchart illustrating a signal transmission/reception method according to embodiments of the present disclosure.

Referring to FIG. 16, embodiments of the present disclosure may be performed by a UE and include receiving DCI (S1601) and transmitting a PUSCH based on the DCI (S1603).

Specifically, the DCI may include frequency resource allocation information about the PUSCH and information about a BWP in which the PUSCH is to be transmitted. The frequency resource allocation information may be included in an FDRA field. The information about the BWP may be included in a bandwidth part indicator (BI) field.

The PUSCH may be transmitted based on one of the proposed methods of Embodiment 1 to Embodiment 4. For example, the PUSCH transmission may be performed based on Embodiment 4.

According to 4-2 of Embodiment 4, BWP switching may take place by DCI. Accordingly, the UE may transmit a PUSCH in a specific BWP different from a current BWP, based on the DCI.

Referring to 4-1 of Embodiment 4, information about an RB set (or LBT sub-band) may be configured in a separate field or included in the FDRA field. For example, referring to 4-3-C, the FDRA field of the DCI may include K LSBs including the information about the RB set. The FDRA field includes K LSBs, and MSBs including information about an interlace allocation. The UE transmits the PUSCH in an interlace based on the information about the interlace allocation.

In additional, regarding BWP switching, the DCI may be interpreted and the PUSCH may be transmitted, based on the proposed methods of 4-3. For example, referring to 4-3-1-iii, when the FDRA field of the DCI includes K LSBs providing information about an RB set according to 4-3-C, only L MSBs or LSBs among K bits is interpreted as the information about the RB set, based on N being greater than M. In other words, based on N being greater than M, L bits being MSBs or LSBs among the K bits are truncated. The K bits are reduced to L bits by the truncation. Referring to 4-3-3-iii, when the FDRA field of the DCI includes K LSBs providing information about an RB set according to 4-3-C, zeroes are padded at the beginning or end of the K bits based on N being smaller than M. The K bits are increased to L bits by the zero padding.

It may be concluded from 4-3-1-iii and 4-3-3-iii that based on the number N of RB sets configured in a current active BWP being different from the number of RB sets configured in the specific BWP, K bits are changed (e.g., increased or decreased) to L bits.

RB sets in which the UE is to perform LBT are determined based on L bits, not K bits. The UE performs a channel access procedure (CAP) for the RB sets determined based on the L bits and transmits the PUSCH based on the result of the CAP.

One or more of the operations described with reference to FIGS. 1 to 16 and/or the operations described with reference to Embodiment 1 to Embodiment 4 may be additionally performed in combination with the operation described in relation to FIG. 16.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 17:
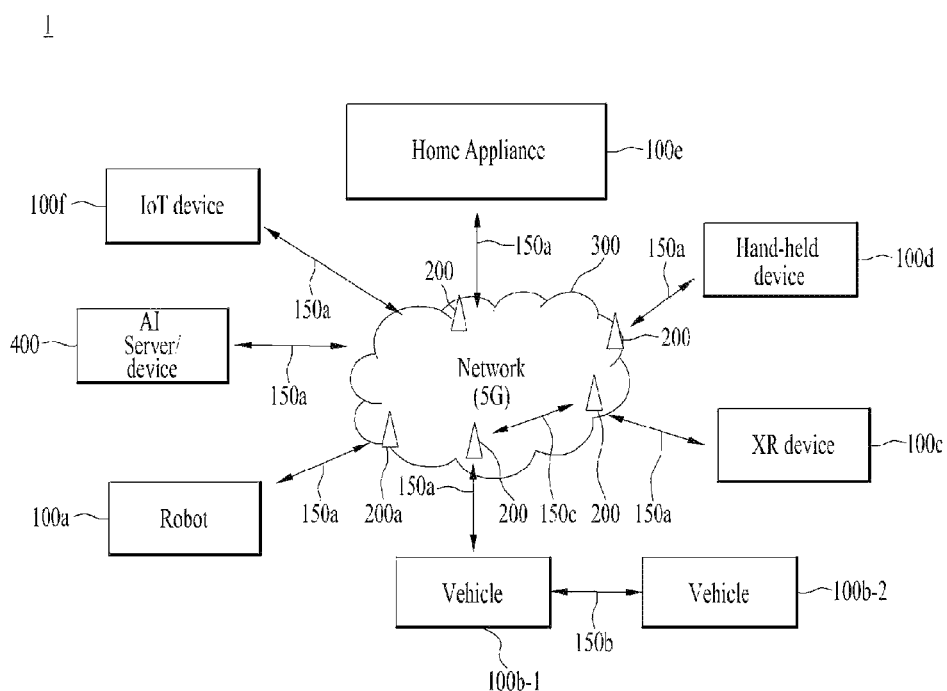
FIGS. 17 to 20 illustrate devices according to an embodiment of the present disclosure.

FIG. 17 illustrates a communication system 1 applied to the present disclosure.

Referring to FIG. 17, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and received on various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 18:
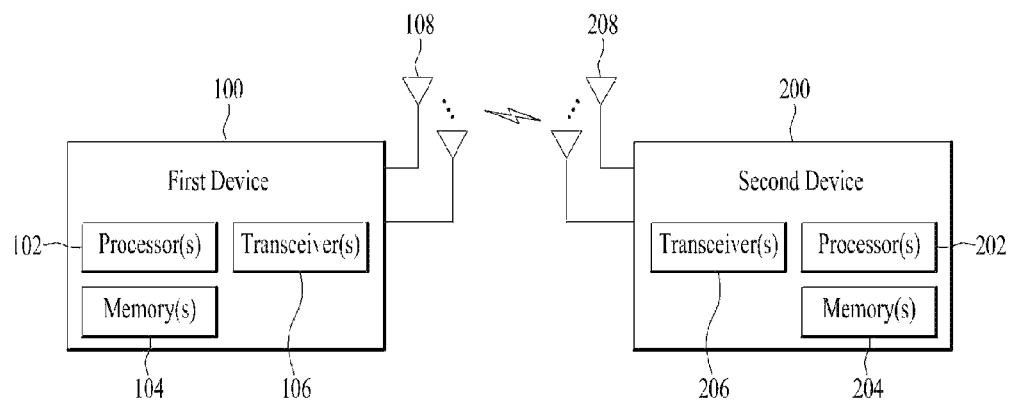

FIG. 18 illustrates wireless devices applicable to the present disclosure.

Referring to FIG. 18, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 19:
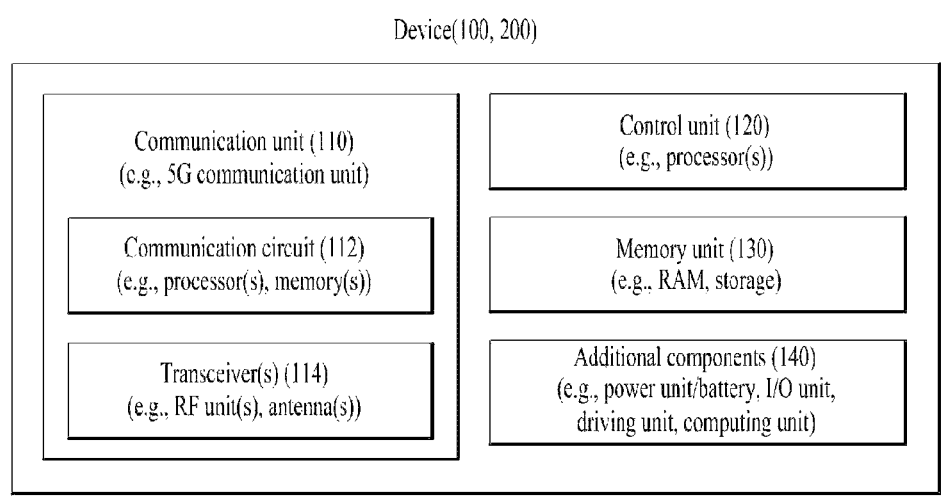

FIG. 19 illustrates another example of a wireless device applied to the present disclosure. The wireless device may be implemented in various forms according to a use case/service (refer to FIG. 17).

Referring to FIG. 19, wireless devices 100 and 200 may correspond to the wireless devices 100 and 200 of FIG. 18 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcasting terminal, a hologram device, a public safety device, an MTC device, a medical device, a FinTech device (or a finance device), a security device, a climate/environment device, the AI server/device (400 of FIG. 17), the BSs (200 of FIG. 17), a network node, or the like. The wireless device may be mobile or fixed according to a use case/service.

In FIG. 19, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 20:
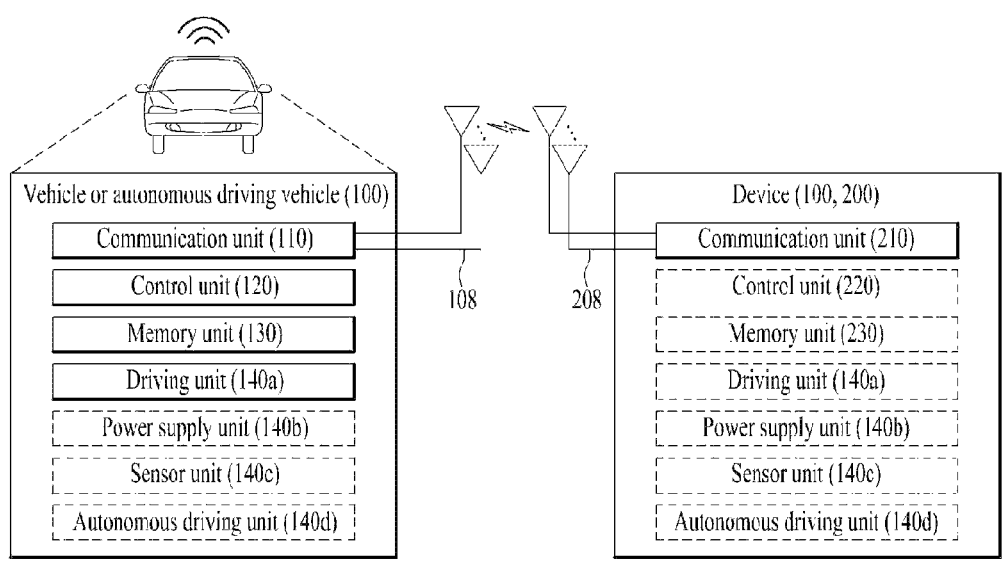

Example of Vehicle or Autonomous Driving Vehicle to which the Present Disclosure is Applied FIG. 20 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method of transmitting and receiving a signal by a user equipment (UE) in a wireless communication system, the method comprising:
   receiving downlink control information (DCI); and
   transmitting a physical uplink shared channel (PUSCH) based on the DCI,
   wherein the PUSCH is transmitted in a specific bandwidth part (BWP) different from a current active BWP, based on the DCI,
   wherein a frequency domain resource assignment (FDRA) field in the DCI includes K least significant bits (LSBs) including information about a resource block (RB) set, and
   wherein based on the number N of RB sets configured in the current active BWP being different from the number M of RB sets configured in the specific BWP, the K bits are changed to L bits.

2. The method according to claim 1, wherein based on N being greater than M, the K bits are decreased to the L bits by truncating one or more most significant bits (MSBs) among the K bits.

3. The method according to claim 1, wherein based on N being less than M, the K bits are increased to the L bits by padding zeroes before the K bits.

4. The method according to claim 1, wherein based on the L bits, the RB set is determined, and
   wherein after a channel access procedure (CAP) is performed for the RB set, the PUSCH is transmitted.

5. The method according to claim 1, wherein the FDRA field includes the K bits and an MSB including information about an interlace allocation, and
   wherein the PUSCH is transmitted in an interlace based on the information about the interlace allocation.

6. A user equipment (UE) for transmitting and receiving a signal in a wireless communication system, the UE comprising:
   at least one transceiver;
   at least one processor; and
   at least one memory operably coupled to the at least one processor and storing instructions which when executed, cause the at least one processor to perform specific operations,
   wherein the specific operations include:
   receiving downlink control information (DCI); and
   transmitting a physical uplink shared channel (PUSCH) based on the DCI,
   wherein the PUSCH is transmitted in a specific bandwidth part (BWP) different from a current active BWP, based on the DCI,
   wherein a frequency domain resource assignment (FDRA) field in the DCI includes K least significant bits (LSBs) including information about a resource block (RB) set, and
   wherein based on the number N of RB sets configured in the current active BWP being different from the number M of RB sets configured in the specific BWP, the K bits are changed to L bits.

7. The UE according to claim 6, wherein based on N being greater than M, the K bits are decreased to the L bits by truncating one or more most significant bits (MSBs) among the K bits.

8. The UE according to claim 6, wherein based on N being less than M, the K bits are increased to the L bits by padding zeroes before the K bits.

9. The UE according to claim 6, wherein based on the L bits, the RB set is determined, and
   wherein after a channel access procedure (CAP) is performed for the RB set, the PUSCH is transmitted.

10. The UE according to claim 6, wherein the FDRA field includes the K bits and an MSB including information about an interlace allocation, and
    wherein the PUSCH is transmitted in an interlace based on the information about the interlace allocation.

11. An apparatus for a user equipment (UE), comprising:
    at least one processor; and
    at least one computer memory operably coupled to the at least one processor and storing instructions which when executed, cause the at least one processor to perform operations,
    wherein the operations include:
    receiving downlink control information (DCI); and
    transmitting a physical uplink shared channel (PUSCH) based on the DCI,
    wherein the PUSCH is transmitted in a specific bandwidth part (BWP) different from a current active BWP, based on the DCI,
    wherein a frequency domain resource assignment (FDRA) field in the DCI includes K least significant bits (LSBs) including information about a resource block (RB) set, and
    wherein based on the number N of RB sets configured in the current active BWP being different from the number M of RB sets configured in the specific BWP, the K bits are changed to L bits.

12. The apparatus according to claim 11, wherein based on N being greater than M, the K bits are decreased to the L bits by truncating one or more most significant bits (MSBs) among the K bits.

13. The apparatus according to claim 11, wherein based on N being less than M, the K bits are increased to the L bits by padding zeroes before the K bits.

14. The apparatus according to claim 11, wherein based on the L bits, the RB set is determined, and
    wherein after a channel access procedure (CAP) is performed for the RB set, the PUSCH is transmitted.

15. The apparatus according to claim 11, wherein the FDRA field includes the K bits and an MSB including information about an interlace allocation, and
    wherein the PUSCH is transmitted in an interlace based on the information about the interlace allocation.

* * * * *